(12) United States Patent
Shinba et al.

(10) Patent No.: US 7,960,462 B2
(45) Date of Patent: Jun. 14, 2011

(54) PASTE COMPOSITION FOR LIGHT GUIDE AND LIGHT GUIDE UTILIZING THE SAME

(75) Inventors: Yoichi Shinba, Otsu (JP); Hiroyuki Niwa, Otsu (JP); Yoshiko Tatsuta, Otsu (JP); Koichi Fujimaru, Otsu (JP); Toshihisa Nonaka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 76 days.

(21) Appl. No.: 12/312,436

(22) PCT Filed: Nov. 6, 2007

(86) PCT No.: PCT/JP2007/071510
§ 371 (c)(1),
(2), (4) Date: May 28, 2009

(87) PCT Pub. No.: WO2008/056639
PCT Pub. Date: May 15, 2008

(65) Prior Publication Data
US 2009/0270541 A1    Oct. 29, 2009

(30) Foreign Application Priority Data

Nov. 10, 2006  (JP) ................................ 2006-304942
Apr. 26, 2007  (JP) ................................ 2007-116469

(51) Int. Cl.
*C08K 3/30* (2006.01)
(52) U.S. Cl. ....................... 524/423; 524/418
(58) Field of Classification Search ............. 524/423
See application file for complete search history.

(56) References Cited

U.S. PATENT DOCUMENTS

| 4,585,841 A | 4/1986 | Eguchi et al. ................. 526/240 |
| 7,376,328 B2 * | 5/2008 | Takase et al. ................. 385/143 |
| 7,700,265 B2 * | 4/2010 | Hoshi et al. .................... 430/302 |

FOREIGN PATENT DOCUMENTS

| EP | 0 667 556 A1 | 8/1995 |
| JP | 2003-146992 A | 5/2003 |
| JP | 2004-124237 A | 4/2004 |
| JP | 2005-010770 A | 1/2005 |
| JP | 2005010770 A * | 1/2005 |
| JP | 2005-338202 A | 12/2005 |
| JP | 2006-048039 A | 2/2006 |
| JP | 2006-106708 A | 4/2006 |
| JP | 2006106708 A * | 4/2006 |

OTHER PUBLICATIONS

Translation of JP2006106708, Apr. 2006.*
Translation of JP2005010770, Jan. 2005.*
Supplementary European Search Report dated May 3, 2010, issued in European Patent Application No. 07831242.8-1214/2080773 (PCT/JP2007/071510).

* cited by examiner

*Primary Examiner* — Ling-Siu Choi
*Assistant Examiner* — Hui Chin
(74) *Attorney, Agent, or Firm* — Kubovcik & Kubovcik

(57) ABSTRACT

The present invention is an optical waveguide-forming paste composition including (A) barium sulfate particles with a mean particle diameter of 1 nm or more to 50 nm or less, (B) a compound having a polymerizable group and a carboxyl group, or a phosphoric ester compound having a polymerizable group, and (C) an organic solvent.

9 Claims, 1 Drawing Sheet

[Figure 1]
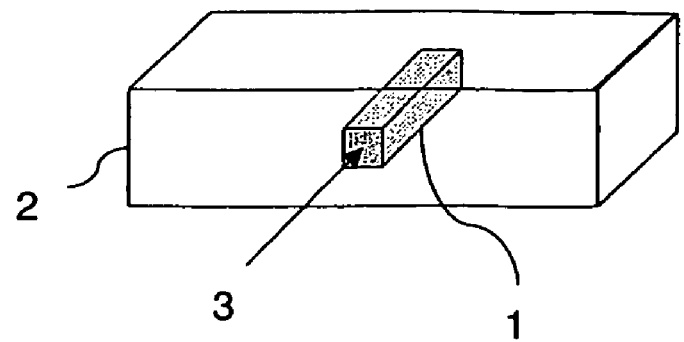
[Figure 2]
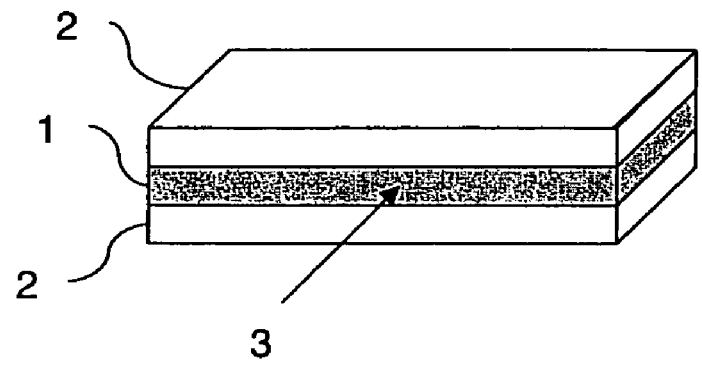

PASTE COMPOSITION FOR LIGHT GUIDE AND LIGHT GUIDE UTILIZING THE SAME

This application is a 371 of international application PCT/JP2007/071510, filed Nov. 6, 2007, which claims priority based on Japanese patent application Nos. 2006-304942 and 2007-116469 filed Nov. 10, 2006, and Apr. 26, 2007, respectively, which are incorporated herein by reference.

BACKGROUND OF THE INVENTION

1. Field of the Invention

The present invention relates to an optical waveguide-forming paste composition. More specifically, the present invention relates to an optical waveguide-forming paste composition including an organic material and barium sulfate particles dispersed therein and to an optical waveguide using the composition.

2. Description of the Related Art

Paste compositions including organic materials such as resins and inorganic particles dispersed therein and cured materials obtained by curing such paste compositions are widely used for printing paints, lubricants, cosmetics, adhesives, release agents, components of displays or circuit boards, and so on. The purposes of dispersing inorganic particles in resins include imparting excellent properties such as thermo-mechanical properties, electromagnetic properties, and optical properties, which are not achievable only with resins, and reducing the content of resins and making the manufacturing cost low in a case where the resins used are expensive. In recent years, there have been attempts to use very small inorganic particles with particle diameters of several tens to several nanometers for dispersions for the purpose of improving the surface flatness or transparency of materials or meeting requirements for micro-machining of semiconductors or the like in various technical fields. Particularly in the field of optical interconnection technology, there have been investigations to develop techniques for dispersing inorganic particles with particle diameters of several tens to several nanometers into resins so that temperature-dependent changes in the refractive index or the dimension of optical waveguide materials can be suppressed, while the transparency of the materials can be ensured.

A method for dispersing inorganic particles into a resin includes first preparing a dispersion solution containing an organic solvent and inorganic particles well dispersed therein and then mixing the dispersion solution with a resin. Commercially available inorganic particles with a mean particle diameter of several tens to several nanometers are often provided in the form of agglomerates (secondary particles) with a mean particle diameter of several tens μm in which individual particles (primary particles) are moderately agglomerated. In order to prepare a dispersion solution of inorganic particles with a mean particle diameter of several tens to several nanometers, therefore, the secondary particles should be deagglomerated in an organic solvent and a dispersion solution containing stably dispersed primary particles should be prepared. However, in such a case where primary particles have a mean particle diameter of less than 50 nm, once dispersed particles may be frequently agglomerated to make a further dispersion process difficult in many cases, because the ratio of the surface area to the volume of the particles is significantly high.

Therefore, there is disclosed a method that includes adding an organic material having a certain functional group or the like at its end, called a dispersant, so that the functional group of the dispersant is located on the surface of the inorganic particles to inhibit the contact between the inorganic particles, which can suppress reagglomeration of primary particles and improve the dispersibility. As an example of this technique, there is proposed a nickel colloid solution containing nickel colloid particles with a mean particle diameter of 20 to 40 nm, a non-polar high-molecular pigment dispersant, and an organic solvent (see for example Patent Literature 1). There is also disclosed a method of using a dispersant to disperse barium sulfate particles into an organic solvent (see for example Patent Literature 2).

However, when a cured material is produced by a method including mixing a resin and a dispersion solution of inorganic particles prepared with conventionally known dispersants to form a paste composition and then curing the paste composition to form a cured material in which the inorganic particles are dispersed, the curing reaction of the resin by photoirradiation or heating is more likely to be insufficient, than when no inorganic particles are used. Therefore, the resulting cured material may have low thermo-mechanical properties. In addition, when photolithographic patterning is performed on a film produced with a paste composition containing inorganic particles and an optically curable resin, the exposed area may be insufficiently cured so that the composition may be eluted during development to form an unclearly patterned portion, or the non-exposed area may have low solubility so that a paste composition residue may be produced during development. Therefore, photolithographically produced optical waveguides may have large optical propagation loss.

It is also known that addition of a polymerizable group-containing phosphoric ester monomer in the process of curing a resin can produce an advantageous effect such as an improvement in the antistatic performance or flame retardancy of the cured material or an improvement in the dispersibility of pigments (particles) dispersed in the resin (see Patent Literature 3).

In general, the dispersibility of pigments (particles) significantly depends on whether the pigment used is an organic or inorganic material. Even among the inorganic pigments, however, for example, barium sulfate particles significantly differ in surface potential, surface smoothness or the like from alumina particles, and, therefore, a certain additive effective in improving the dispersibility of one may reduce the dispersibility of the other. Patent Literature 3 only discloses that inorganic pigments may be used and does not specifically disclose the type of inorganic pigments that can influence the dispersibility as mentioned above.

Patent Literature 1: Japanese Patent Application Laid-Open (JP-A) No. 2004-124237 (Claims and Examples)
Patent Literature 2: JP-A No. 2006-106708 (page 18)
Patent Literature 3: JP-A No. 2003-146992 (page 2)

SUMMARY OF THE INVENTION

Problems to be Solved by the Invention

When barium sulfate particles with a mean particle diameter of 1 nm or more to 50 nm or less are used as a component in an optical waveguide-forming paste composition, addition of conventionally known dispersants to disperse the particles may cause an insufficient curing reaction of the paste composition upon photoirradiation or heating or may cause a difficulty in performing development when photolithographic patterning is performed on a film produced with the paste composition, as mentioned above.

In view of the problems with the conventional art, an object of the present invention is to provide an optical waveguide-forming paste composition that allows reliable curing and provides excellent developability.

Means for Solving the Problems

The present invention is directed to an optical waveguide-forming paste composition including (A) barium sulfate particles with a mean particle diameter of 1 nm or more to 50 nm or less, (B) a compound having a polymerizable group and a carboxyl group, or a phosphoric ester compound having a polymerizable group, and (C) an organic solvent. The present invention is also directed to an optical waveguide including a cured material produced by curing the optical waveguide-forming paste composition.

EFFECTS OF THE INVENTION

The optical waveguide-forming paste composition of the present invention is reliably cured by photoirradiation or heating. When photolithographic patterning is performed, the optical waveguide-forming paste composition of the present invention provides very good curability for the exposed area and very good developability for the non-exposed area. The use of the optical waveguide-forming paste composition of the present invention allows production of optical waveguides having low temperature-dependent change rate of refractive index, small coefficient of linear expansion, and low optical propagation loss.

BRIEF DESCRIPTION OF THE DRAWINGS

FIG. 1 is a schematic diagram showing a channel optical waveguide structure; and FIG. 2 is a schematic diagram showing a slab optical waveguide structure.

DESCRIPTION OF REFERENCE SYMBOLS

In the drawings, reference numeral 1 represents a core, 2 a cladding, and 3 an optical signal.

BEST MODE FOR CARRYING OUT THE INVENTION

The optical waveguide-forming paste composition of the present invention (hereinafter referred to as "the paste composition") includes (A) barium sulfate particles, (B) a compound having a polymerizable group and a carboxyl group, or a phosphoric ester compound having a polymerizable group, and (C) an organic solvent. Hereinafter, unless otherwise stated, the term "compound A" refers to the compound having a polymerizable group and a carboxyl group, or the phosphoric ester compound having a polymerizable group.

In the paste composition of the present invention, the compound A has the function of dispersing barium sulfate particles. The carboxyl group or the phosphoric ester bond moiety of the compound A interacts with barium sulfate particles so that the surface of the barium sulfate particles can be covered with the compound A. It is considered that the polymerizable group of the compound A placed over the surface of the barium sulfate particles can face outward and be compatible with the organic solvent and other compounds in the paste composition to allow the barium sulfate particles to form a stable dispersion.

The polymerizable group of the compound A is an organic group capable of allowing polymerization to proceed through a polyaddition reaction, a radical reaction, or the like caused by light or heat. In the paste composition of the present invention, the compound A is involved in polymerization so that curing can be allowed to proceed rapidly and reliably.

In the present invention, the compound A itself is optically or thermally polymerized to form a matrix resin in a cured material. Therefore, the compound A used in the present invention can function not only to serve as a dispersant for the barium sulfate particles but also to form a matrix resin. If a dispersant having no polymerizable group is used to disperse barium sulfate into a matrix-forming resin having a polymerizable group, barium sulfate particles may migrate and gather in the process of polymerization of the matrix resin so that their dispersibility can be reduced. In contrast, when the paste composition of the present invention is used, the dispersibility of barium sulfate particles can be kept high even in the cured material, because polymerization proceeds while the barium sulfate particles are captured by the compound A. Therefore, the cured material has a high level of transparency and surface flatness.

In addition, the compound A in the paste composition may be cured by light so that photolithographic patterning may be performed. In this case, polymerization proceeds, while the barium sulfate particles are captured by the compound A in the exposed area, so that a strong network can be formed with the barium sulfate particles serving as starting points and that swelling or dissolution of the exposed area can be prevented during development, which leads to the formation of a clear pattern.

In order to well disperse the barium sulfate particles, the polymerizable group of the compound A preferably has a high affinity for the organic solvent and other compounds in the paste composition. Examples of such a polymerizable group include vinyl, acrylate, methacrylate, epoxyacrylate, epoxymethacrylate, and epoxy groups.

Besides the polymerizable group, the compound A has a carboxyl group. The carboxyl group of the compound A interacts with the barium sulfate particles so that the surface of the barium sulfate particles can be covered with the compound A and that the barium sulfate particles can be dispersed. When the compound A in the paste composition of the present invention is cured by light in photolithographic patterning, the non-exposed area can be rapidly dissolved in a developing solution, because the compound A has a carboxyl group, whose polarity is high, and, therefore, the residue left in the non-exposed area during development can be reduced.

The compound A used in the present invention is preferably represented by the following formula (1):

Formula 1

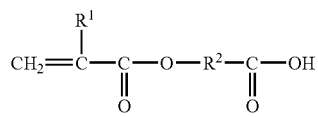

(1)

In the formula (1), $R^1$ represents a hydrogen atom or a methyl group, and $R^2$ represents a bivalent group represented by any one of the following formulae (2) to (4):

Formula 2

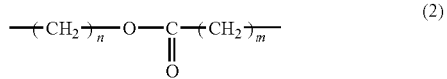

(2)

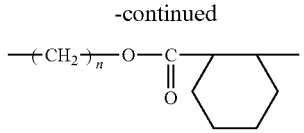 (3)

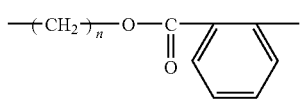 (4)

In the formulae (2) to (4), n and m are each an integer of 1 to 3.

In the formula (1), the polymerizable group is an acrylate group when $R^1$ is a hydrogen atom, or a methacrylate group when $R^1$ is a methyl group. The acrylate or methacrylate group has an unsaturated bond and therefore is capable of undergoing radical polymerization upon photoirradiation or heating. In the process of radical polymerization using light, a photolithographic method including exposure to light through a photomask may be performed to form patterned wirings or the like. The acrylate group having a hydrogen atom for $R^1$ is preferred because of its higher polymerizing ability.

The smaller the n and m values in the formulae (2) to (4), the larger the number of the polymerizable groups and the carboxyl groups per unit weight, which means better polymerizing ability and better dispersibility of the barium sulfate particles. On the other hand, as the n and m values increase, the steric hindrance effect produced by the compound A located on the barium sulfate particles increases so that the dispersibility can increase. Therefore, n and m are each preferably 2, which means an ethylene group having two carbon atoms.

In the compound represented by the formula (1), $R^1$ is preferably a hydrogen atom, and $R^2$ is preferably a bivalent group represented by the formula (4). In this case, n is preferably 2 for the reason described above. When such a compound is used, higher polymerizing ability and higher developability can be provided, and better dispersibility of the barium sulfate particles can also be provided, which allows a reduction in the mean particle diameter of the dispersed barium sulfate particles so that a cured material with improved transparency can be produced from the paste composition. In this case, therefore, an optical waveguide with low optical propagation loss can be obtained.

Examples of the compound A represented by the formula (1) used in the present invention include HOA-MS (trade name) in which $R^1$ in the formula (1) is a hydrogen atom, $R^2$ is represented by the formula (2), and n and m are each 2, HOA-HH (trade name) in which $R^1$ in the formula (1) is a hydrogen atom, $R^2$ is represented by the formula (3), and n is 2, and HOA-MPL (trade name) in which $R^1$ in the formula (1) is a hydrogen atom, $R^2$ is represented by the formula (4), and n is 2, each manufactured by KYOEISHA CHEMICAL Co., LTD.

On the other hand, the compound A represented by the formula (5) below is also preferably used.

Formula 3

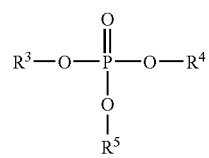 (5)

In the formula (5), $R^3$ to $R^5$ each represent a monovalent group represented by any one of the following formulae (6) to (10), or a hydrogen atom, and $R^3$ to $R^5$ may be the same or different, provided that not all of $R^3$ to $R^5$ are hydrogen atoms.

Formula 4

 (6)

 (7)

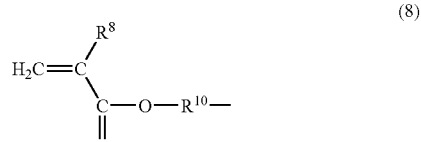 (8)

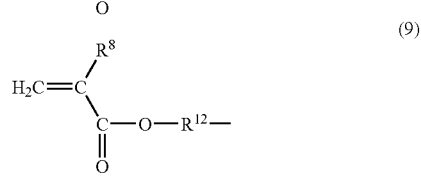 (9)

 (10)

In the formulae (6) to (10), $R^6$ to $R^9$ each represent a hydrogen atom or a methyl group, $R^{10}$ and $R^{11}$ each represent a bivalent group of 1 to 10 carbon atoms, preferably a bivalent hydrocarbon group of 1 to 10 carbon atoms, more preferably an alkyl group of two carbon atoms, and $R^{12}$ represents a bivalent group of 1 to 10 carbon atoms having a hydroxyl group, preferably an organic group represented by any one of the following formulae (13) to (15):

Formula 5

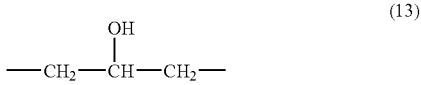 (13)

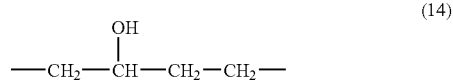 (14)

-continued

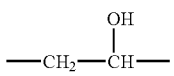
(15)

As the compound A represented by the formula (5), a phosphoric monoester in which any two of $R^3$ to $R^5$ are each a hydrogen atom is preferred to a phosphoric diester in which any one of $R^3$ to $R^5$ is a hydrogen atom, because the former can further increase the dispersibility of the barium sulfate particles than the latter. The phosphoric diester is preferred to a phosphoric triester in which none of $R^3$ to $R^5$ is a hydrogen atom, because the former can further increase the dispersibility of the barium sulfate particles than the latter.

The monovalent group represented by any one of the formulae (6) to (9) has an acrylate or methacrylate group and is capable of undergoing radical polymerization upon photoirradiation or heating. The monovalent group represented by the formula (10) is capable of undergoing ionic polymerization upon photoirradiation or heating. The acrylate group in which $R^6$ to $R^9$ are each a hydrogen atom is preferred because of its higher polymerizing ability.

The smaller the number of carbon atoms in each of $R^{10}$ to $R^{12}$ in the formulae (8) to (10), the larger the number of the polymerizable groups and the phosphoric ester bond moieties per unit weight, which means better polymerizing ability and better dispersibility of the barium sulfate particles. As the number of carbon atoms in each of $R^{10}$ to $R^{12}$ increase, the steric hindrance effect produced by the compound A located on the barium sulfate particles increases so that the dispersibility can increase. Therefore, the number of carbon atoms in each of $R^{10}$ to $R^{12}$ is preferably from 1 to 4.

In the compound represented by the formula (5), at least one of $R^3$ to $R^5$ is particularly preferably a monovalent group represented by the formula (8) in which $R^{10}$ is more preferably a bivalent hydrocarbon group of 1 to 3 carbon atoms. In addition, at least one of $R^3$ to $R^5$ in the formula (5) is preferably a monovalent group represented by the formula (9), and $R^{12}$ in the formula (9) is preferably a bivalent hydrocarbon group of 2 to 3 carbon atoms having a hydroxyl group.

Examples of the compound A represented by the formula (5) used in the present invention include LIGHT-ACRYLATE P-1A (trade name) manufactured by KYOEISHA CHEMICAL Co., LTD. (a phosphoric monoester having an acrylate group), LIGHT-ESTER P-1M (trade name) manufactured by KYOEISHA CHEMICAL Co., LTD. (a phosphoric monoester having a methacrylate group), LIGHT-ESTER P-2M (trade name) manufactured by KYOEISHA CHEMICAL Co., LTD. (a phosphoric diester having a methacrylate group), and RDX 63182 manufactured by DAICEL-CYTEC COMPANY LTD. (a phosphoric diester having an epoxyacrylate group). One or more types of the compound A may be used in the present invention.

The temperature-dependent change in the physical properties of the cured material produced from the paste composition of the present invention is very small, and, for example, the temperature-dependent refractive-index change rate or linear expansion coefficient is small. Dispersants used to increase the dispersibility of inorganic particles may inhibit a curing reaction of a resin in a paste composition or increase the temperature-dependent refractive-index change rate or linear expansion coefficient of a cured material produced from a paste composition so that the properties of the cured material may be degraded. It has been therefore preferred that the dispersant content should be as low as possible. In the present invention, the compound A itself, which contributes to the dispersibility of the barium sulfate particles, is polymerizable or curable or can be involved in the polymerization with a resin as described later, so that degradation of the properties of the cured material, such as an increase in the temperature-dependent refractive-index change rate or linear expansion coefficient, can be prevented.

The paste composition of the present invention may also contain any other matrix-forming resin, although the compound A can be polymerized to form a matrix in a cured material as described above. Examples of such a resin that may be used to form a matrix include heat or UV curing resins having a polymerizable group, such as polyamic acid, vinyl resins, norbornene resins, epoxy resins, acrylate resins, methacrylate resins, epoxyacrylate resins, epoxymethacrylate resins, cyanate resins, bismaleimide-triazine resins, benzocyclobutene resins, and siloxane resins; and thermoplastic resins such as aramid resins, polystyrene, polyether imide, polyphenylene ether, and thermoplastic polyimide. One or more of these resins may be used alone or in any appropriate mixture ratio.

For applications requiring heat resistance or the like in the process, polymerizable group-containing resins such as heat or UV curing resins are preferred among the resins listed above. When the cured material produced from the paste composition is used for optical waveguide-forming materials which require transparency, epoxy resins, acrylate resins, methacrylate resins, epoxyacrylate resins, epoxymethacrylate resins, siloxane resins, or the like are preferably used. In particular, UV curing resins are preferably selected, because patterned optical waveguides can be formed by photolithographic method using them.

In the present invention, the polymerizable groups of the heat or UV curing resin may be polymerized with one another, or the polymerizable group of the heat or UV curing resin may be polymerized with the polymerizable group of the compound A. The polymers formed in the cured material according to the present invention may include various types of polymers such as (a) a polymer of the compound A, (b) a polymer of the compound A and the resin, and (c) a polymer of only the resin, and the barium sulfate particles may be dispersed in these polymers. Unless otherwise stated, each of the polymers (a) to (c) in the cured material produced from the paste composition will be simply referred to as the "polymer."

In the cured material obtained from the paste composition, one or more of the polymers (a) to (c) may exist alone or in combination depending on the components of the paste composition, such as the compound A, the resin, and a polymerization initiator.

For example, when the polymerizable group of the compound A and the polymerizable group of the resin are each an acrylate group, a relatively large amount of the compound A exists in the vicinity of the barium sulfate particles, and, therefore, a relatively large amount of the polymer (a) exists in the vicinity of the barium sulfate particles, a relatively large amount of the polymer (c) exists in a region distant from the barium sulfate particles, and the polymer (b) exists in an intermediate region between them. In another example, a cured material including the polymers (a) and (c) may be produced from the paste composition containing the compound A having an acrylate group as the polymerizable group and a resin having an epoxy group as the polymerizable group. Alternatively, different resins may be used. In such a case, for example, the compound A having an acrylate group as the polymerizable group, a resin having an epoxyacrylate group as the polymerizable group, and another resin having an epoxy group as the polymerizable group may be used, and the three components may be copolymerized to form the polymer (b).

When the polymer in the cured material according to the present invention has a refractive index close to that of the barium sulfate particles, the Rayleigh scattering of light in the cured material is low so that the cured material can have high transparency. For transparency requiring applications such as optical materials, the types and mixing ratio of the compound A and the resin are preferably determined so that a polymer having the desired refractive index can be produced. Since barium sulfate has a refractive index of 1.6, the resulting polymer preferably has a refractive index close to 1.6, more preferably a refractive index of 1.6, in order to provide high transparency.

ferred, because they are suitable for radical polymerization. Optical interconnection materials should preferably have a refractive index close to that of the barium sulfate particles as described above. Examples of such materials include an acrylate resin represented by the formula (11) below (1.55 in refractive index) and an epoxyacrylate resin represented by the formula (12) below (1.56 in refractive index). When photolithographic patterning is performed using the paste composition, the resin represented by the formula (11) below is preferably selected so that the residue in the non-exposed area can be reduced during development. The resin represented by the formula (12) below is also preferably selected so that a cured material with low temperature-dependent change rate of refractive index and small coefficient of linear expansion can be produced from the paste composition.

Formula 6

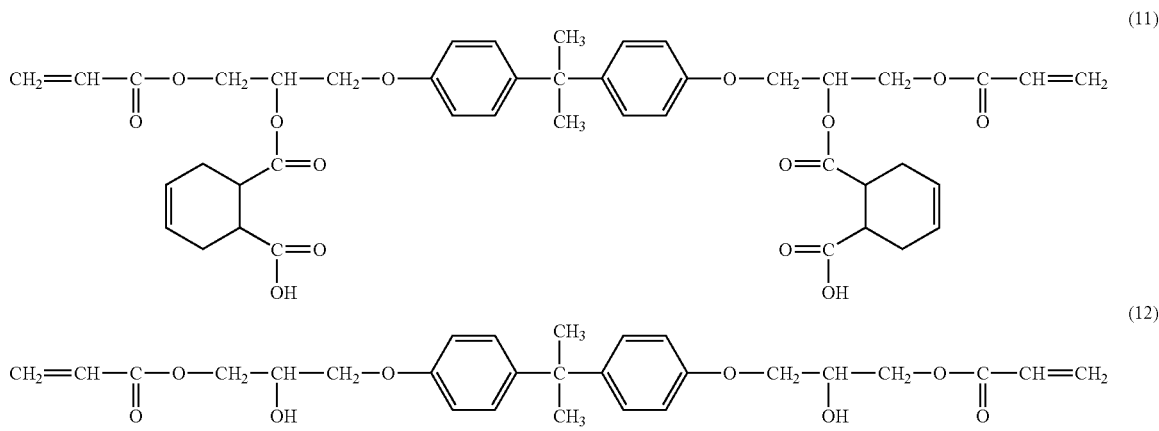

The polymer is produced from components of the paste composition other than the barium sulfate particles, such as a dispersant and the resin. Therefore, the type and amount of each material to be mixed are preferably determined so that the resulting polymer can have a refractive index close to 1.6. When different materials having different refractive indices are mixed to form a polymer having a certain refractive index, it is preferred that each material should have a refractive index close to the desired refractive index so that a polymer with small variations in refractive index can be easily produced.

The examples of the compound A listed above, HOA-MS, HOA-HH, HOA-MPL, LIGHT-ACRYLATE P-1A, LIGHT-ESTER P-1M, LIGHT-ESTER P-2M, and RDX 63182, have refractive indices of 1.46, 1.48, 1.52, 1.47, 1.47, 1.47, and 1.54, respectively. For optical material applications such as optical waveguides, HOA-MPL or RDX 63182, of which refractive index is close to that of barium sulfate, is preferably used, because a cured material with good transparency can be easily produced from the paste composition containing it.

When the cured material produced from the paste composition of the present invention is used for optical waveguide materials requiring heat resistance and transparency, the polymerizable group of the heat or UV curing resin is preferably an epoxy, acrylate, methacrylate, epoxyacrylate, or epoxymethacrylate group. When an epoxy resin or the like is cationically polymerized, the activated cations may adsorb to the barium sulfate particles to slow down the polymerization reaction. Therefore, acrylate resins, methacrylate resins, epoxyacrylate resins, or epoxymethacrylate resins are pre- The amount of the compound A in the paste composition of the present invention is preferably from 5 parts by weight or more to 20 parts by weight or less, based on 100 parts by weight of the barium sulfate particles. The compound A in an amount of 5 parts by weight or more based on the amount of the barium sulfate particles can increase the dispersibility of the barium sulfate particles and reduce the size of the dispersed barium sulfate particles so that a cured material with improved transparency can be produced from the paste composition of the present invention. In this case, optical waveguides with low optical propagation loss can be obtained. Considering the difference between the refractive indices of the compound A and barium sulfate, a cured material with improved transparency can be produced from the paste composition containing the compound A in an amount of 20 parts by weight or less based on the amount of the barium sulfate particles. In this case, optical waveguides with low optical propagation loss can be obtained.

The preferred content of the compound A in paste composition of the present invention (based on the total amount of the paste composition) may differ between the case where a polymer of only the compound A is produced by curing and the case where a polymer of the compound A and a resin is produced by curing. For example, when the compound A alone is polymerized to form a cured material in the mode (a), the content of the compound A is preferably, but not limited to, from 20% by weight or more to 70% by weight or less, based on the amount of the solid components in the paste composition, exclusive of volatile components such as the organic solvent. When the content of the compound A is 20% by weight or more based on the amount of the solid components in the paste composition, exclusive of volatile components such as the organic solvent, the resulting cured material can have improved cracking resistance and adhesion to substrates and high resistance to cohesive fracture. The content of the compound A is more preferably 30% by weight or more based on the amount of the solid components in the paste composition, exclusive of volatile components such as the organic solvent, so that the effects can be enhanced. When the content of the compound A is 70% by weight or less based on the amount of the solid components in the paste composition, exclusive of volatile components such as the organic solvent, the resulting cured material can have low temperature-dependent change rate of refractive index and small coefficient of linear expansion. The content of the compound A is more preferably 50% by weight or more based on the amount of the solid components in the paste composition, exclusive of volatile components such as the organic solvent, so that the effects can be enhanced.

On the other hand, when the polymer (b) or (c) is produced to form a cured material, the total content of the compound A and the resin is preferably 20% by weight or more, more preferably 30% by weight or more, based on the amount of the solid components in the paste composition, exclusive of volatile components such as the organic solvent. The total content of the compound A and the resin is preferably 70% by weight or less, more preferably 50% by weight or less, based on the amount of the solid components in the paste composition, exclusive of volatile components such as the organic solvent. The reason why the range is preferred is the same as described above for the mode (a). The mixing ratio of the compound A and the resin may be determined as needed depending on the composition ratio of the polymer of the compound A and the resin to be produced. In this case, the content of the compound A is preferably 1% by weight or more based on the amount of the barium sulfate particles so that the dispersibility of the barium sulfate particles can be improved.

When the polymerizable group-containing resin is used, the polymerization properties of the compound A and the resin should preferably be taken into account when the mixing ratio between them is determined. Specifically, the mixing ratio of the compound A and the resin may differ between the case (b1) where the compound A and the polymerizable group-containing resin are each independently polymerized, the case (b2) where the polymerizable group-containing resin is polymerized from a molecule of the compound A as a starting point into a chain, and the case (b3) where the compound A and the polymerizable group-containing resin are alternately polymerized. In an example of the case (b3), the compound A having an epoxyacrylate group as the polymerizable group and an epoxy resin may be alternately polymerized. In this case, the number of the polymerizable groups should preferably be the same between both materials.

In order to accelerate the polymerization of the compound A and the resin, the paste composition of the present invention may also contain a polymerization initiator capable of producing an active species such as a radical, cation or anion. There are different polymerization initiators capable of being activated by photoirradiation or heat treatment, and they may be selected and used depending on the intended use. When the paste composition is formed into a film and then subjected to photolithographic patterning, a polymerization initiator capable of being activated by photoirradiation should be used. For example, oxime, benzophenone, triazine, or benzotriazole polymerization initiators can produce radicals upon UV irradiation. Phosphonium, sulfonium, or iodonium polymerization initiators can produce cations upon UV irradiation.

The paste composition of the present invention contains barium sulfate with a mean particle diameter of 1 nm or more to 50 nm or less. As used herein, the term "mean particle diameter" indicates number average particle diameter. In the paste composition, the barium sulfate particles may exist in the form of primary particles, which are completely deagglomerated, and in the form of agglomerates of a plurality of primary particles. Therefore, the particle diameter of the barium sulfate particles in the paste composition is intended to include the particle diameter of the non-agglomerated primary particles and the particle diameter of agglomerates of the primary particles. In order to produce a paste composition containing dispersed barium sulfate particles with a mean particle diameter of 50 nm or less, it is necessary to use barium sulfate particles in which primary particles have a mean particle diameter of 50 nm or less. For example, BF-40 manufactured by SAKAI CHEMICAL INDUSTRY CO., LTD. (10 nm in mean primary particle diameter) satisfies the requirement. The mean particle diameter of the barium sulfate particles in the paste composition may be measured by a method that includes directly observing the particles with a SEM (scanning electron microscope) or a TEM (transmission electron microscope) and calculating the number average of particle diameters. When the mean particle diameter of the barium sulfate particles in the paste composition is 50 nm or less, improved uniformity can be provided for each of the paste composition and the cured material, and Rayleigh scattering of light caused by the barium sulfate particles can be small so that high transparency can be provided. Optical waveguides with low optical propagation loss can be produced using such a paste composition. When the mean particle diameter of the barium sulfate particles dispersed in the paste composition is 30 nm or less, Rayleigh scattering of light caused by the barium sulfate particles in the cured material produced from the paste composition can be very small so that the cured material can exhibit transparency as high as that of a cured material produced from a barium sulfate particle-free composition. Optical waveguides with very low optical propagation loss can be produced using such a material. On the other hand, when the barium sulfate particles have a particle diameter of 1 nm or more, the specific surface area of the particles is small relative to their volume so that the particles can have high dispersibility.

In the present invention, the content of the barium sulfate particles in the paste composition is preferably from 30% by weight or more to 80% by weight or less based on the amount of the solid components in the paste composition, exclusive of volatile components such as the organic solvent. When the content of the barium sulfate particles is 30% by weight or more based on the amount of the solid components in the paste composition, a cured material with reduced temperature-dependent change rate of refractive index and reduced coefficient of linear expansion can be produced from the paste composition. The content of the barium sulfate particles is preferably 50% by weight or more based on the amount of the solid components in the paste composition. When the content of the barium sulfate particles is 80% by weight or less based on the amount of the solid components in the paste composition, cracking resistance and adhesion to substrates can be improved, and high resistance to cohesive fracture can be provided. When such a material is used, a cured material with high transparency can be obtained, and, therefore, optical waveguides with low optical propagation loss can be obtained. The content of the barium sulfated particles is preferably 70% by weight or less based on the amount of the solid components in the paste composition so that the residue left in the non-exposed area during development can be reduced in the process of photolithographic patterning.

The paste composition of the present invention contains an organic solvent. Examples of the organic solvent include N,N-dimethylacetamide, N-methyl-2-pyrrolidone, dimethylimidazolidinone, dimethylsulfoxide, γ-butyrolactone, ethyl lactate, 1-methoxy-2-propanol, 1-ethoxy-2-propanol, ethylene glycol mono-n-propyl ether, diacetone alcohol, and tetrahydrofurfuryl alcohol.

The paste composition of the present invention preferably contains a silane coupling agent. When a silane coupling agent is used, thinning or peeling of a patterned portion in an exposed area and cracking can be reduced and suppressed in the process of photolithographic patterning so that clear patterns can be formed and that the residue left in the non-exposed area can be further reduced. In general, silane coupling agents are known to be effective in improving adhesion between inorganic and organic materials. In the present invention, the silane coupling agent is expected to be effective in improving adhesion between the resin component and the inorganic component in the composition or adhesion between the resin component in the composition and an inorganic substrate such as a silicon wafer and effective in reducing cracking and thinning or peeling of a patterned portion in an exposed area in the process of photolithographic patterning. It is also considered that the residue in the non-exposed area can be effectively reduced in the process of photolithographic patterning, for the reason described below. When a developing solution is brought into contact with the non-exposed area, the resin and the compound A are eluted, and the barium sulfate particles captured by the compound A are also eluted. As the compound A is dissociated from the barium sulfate particles during the development process, the barium sulfate particles with exposed surfaces can agglomerate with each other along with the resin or the like in the vicinity to form a development residue. In the presence of a silane coupling agent, however, the binding force between the compound A (an organic component) and the barium sulfate particles (an inorganic component) is made stronger by the silane coupling agent so that the dispersibility of the barium sulfate particles can be maintained during the development, while the composition can be rapidly dissolved, and as a result, the residue is less likely to form.

Preferred examples of the silane coupling agent include 3-glycidoxypropyltrimethoxysilane, 3-glycidoxypropyltriethoxysilane, 3-methacryloxypropyltrimethoxysilane, 3-methacryloxypropyltriethoxysilane, N-2(aminoethyl)-3-aminopropyltrimethoxysilane, N-2(aminoethyl)-3-aminopropyltriethoxysilane, 3-isocyanatopropyltrimethoxysilane, and 3-isocyanatopropyltriethoxysilane. The content of the silane coupling agent in the paste composition is preferably from 0.1% by weight or more to 10% by weight or less based on the amount of the solid components in the paste composition, exclusive of volatile components such as the organic solvent. When the content of the silane coupling agent is 0.1% by weight or more based on the amount of the solid components in the paste component, the silane coupling agent can sufficiently produce the above effect. Common silane coupling agents including those listed above have refractive indices of 1.45 or less, which are significantly different from that of the barium sulfate particles. Therefore, the content of the silane coupling agent should preferably be 10% by weight or less based on the amount of the solid components in the paste composition so that Rayleigh scattering can be reduced and that transparency can be improved.

The paste composition of the present invention may also contain a dispersant other than the compound A. The amount of the dispersant other than the compound A is preferably from 5 parts by weight or more to 20 parts by weight or less based on 100 parts by weight of the barium sulfate particles. At least 5 parts by weight of the dispersant other than the compound A can be significantly effective in improving the dispersibility of the barium sulfate particles. When the amount of the dispersant is 20 parts by weight or less, a cured material with low temperature-dependent change rate of refractive index and small coefficient of linear expansion can be produced from the paste composition.

Next, methods for producing the paste composition of the present invention are described in detail below. First, a description is given of methods for producing a dispersion solution of barium sulfate particles in an organic solvent.

Barium sulfate particles (containing secondary particles and agglomerates) with a mean primary particle diameter of 50 nm or less, the compound A, and an organic solvent, and optionally an additional resin, a pH adjusting agent, a polymerization inhibitor, or the like are mixed in a specific proportion and stirred. Immediately after the mixing, the surface of the barium sulfate particles may be covered with an air layer so that the barium sulfate particles may be insufficiently wetted with the organic solvent to increase the viscosity. In such a case, the mixture is preferably stirred with a rotating blade or the like for a relatively long time until the barium sulfate particles are completely wetted with the organic solvent.

In the process of mixing the barium sulfate particles, the whole amount of the resin necessary for the production of the desired cured material or a partial amount thereof may be added. The resin and the barium sulfate particles can be more uniformly mixed when the resin is added before a dispersion process than when the resin is added after a dispersion process. When the resin is added before the dispersion process, however, the viscosity of the dispersion solution may increase to reduce the efficiency of the dispersion process, or after the dispersion process, the dispersion solution may have low storage stability. All the necessary amount of the compound A may be added before the dispersion process, or part of the necessary amount may be added before the dispersion process, and the remainder may be added after the dispersion process. Alternatively, the compound A and other materials may be added gradually, while the viscosity and any other state of the dispersion solution are measured during the dispersion process.

A polymerization initiator, a defoaming agent, an antioxidant, a polymerization inhibitor, a plasticizer, a silane coupling agent, or any other material necessary for the production of the desired cured material may also be added. In view of the storage stability of the dispersion solution, a polymerization initiator or the like should preferably be added immediately before the preparation of the paste composition is completed.

The barium sulfate particles (including secondary particles and agglomerates), the compound A, the organic solvent, and other necessary materials may be mixed and stirred, and then the barium sulfate particles may be subjected to the dispersion process using a dispersing device.

For example, the dispersing device may be a bead mill such as ULTRA APEX MILL (trade name) manufactured by KOTOBUKI INDUSTRIES CO., LTD. or STAR MILL (trade name) manufactured by ASHIZAWA FINETECH LTD. The beads used in the bead mill preferably have a mean particle diameter of 0.01 mm or more to 0.5 mm or less. When the beads have a mean particle diameter of 0.5 mm or less, the barium sulfate particles can be frequently brought into contact with the beads in the bead mill so that a sufficient dispersing effect can be obtained. When the beads have a mean particle diameter of 0.01 mm or more, each bead can have large momentum so that sufficient shearing stress can be obtained for dispersion of the agglomerated barium sulfate particles.

Ceramic beads, glass beads, metal beads, or the like may be used. Examples of the material of beads include soda glass, quartz, titania, silicon nitride, silicon carbide, alumina, zirconia, zirconium silicate, steel, and stainless steel. In particular, zirconia beads are preferably used, because of their high hardness.

Dispersion with a bead mill may be performed in a single process using small beads or performed while the size of beads is changed stepwise. For example, a dispersion process using beads with a particle diameter of 0.5 mm may be performed first until the particle diameter of the dispersed barium sulfate particles reaches about 100 nm, and then another dispersion process using much smaller beads may be performed.

The time to be spent for the dispersion process may be appropriately determined depending on the type and composition ratio of the components of the dispersion solution, such as the barium sulfate particles, the compound A, and the organic solvent. A sample may preferably be taken from the dispersion solution at regular intervals to determine the mean particle diameter of the barium sulfate particles in the dispersion solution so that changes in the dispersion state can be monitored over time and the time to end the dispersion process can be determined. The particle diameter of the barium sulfate particles in the dispersion solution may be measured with a dynamic light scattering meter such as Zetasizer Nano ZS (trade name) manufactured by Sysmex Corporation. Next, a description is given of methods of producing the paste composition by mixing the dispersion solution obtained as described above with the resin and so on. However, when all the materials necessary for the production of the cured material are mixed to form the dispersion solution, the dispersion solution obtained by the method described above corresponds to the paste composition of the present invention.

When the resin is added to a dispersion solution of the barium sulfate particles, the type and the amount of the resin to be mixed should be selected depending on the components of the dispersion solution, such as the compound A. When the paste composition containing dispersed barium sulfate particles according to the present invention is used for the production of an optical waveguide, the polymer produced from the compound A and the resin preferably has a refractive index close to that of the barium sulfate particles (1.6) so that an optical waveguide with low optical propagation loss can be produced. In the process of mixing the dispersion solution and the resin, the dispersion solution may be added to the resin until a specific amount is reached, or the resin may be added to the dispersion solution until a specific amount is reached. The compound A may be further added to adjust the composition while the paste composition is prepared.

The paste composition produced by mixing specific amounts of the dispersion solution and the resin may be subjected to a process using a ball mill or a roll mill so that it can be more homogeneous. When air bubbles are incorporated into the paste composition in the mixing process, the air bubbles should be removed by standing, placing under reduced pressure, or using a mixing defoamer so that incorporation of air bubbles into a cured material produced from the paste composition can be avoided.

In order to adjust the viscosity of the paste composition, the organic solvent may be further added, or an adequate amount of the organic solvent may be removed by heating or under reduced pressure. The polymerization reaction of the compound A or the resin may also be allowed to moderately proceed by heating or photoirradiation.

The paste composition produced as described above may be cured to form a cured material containing the barium sulfate particles dispersed in a polymer.

Next, a description is given of some examples of the method for curing the paste composition of the present invention. First, the paste composition may be applied to a substrate and spread into a film or strings, poured into a mold, or subjected to any other forming process, and then the organic solvent may be removed from the paste composition by heat treatment. Examples of methods for removing the organic solvent include heating and drying in an oven or on a hot plate, vacuum drying, and heating by electromagnetic waves such as infrared rays or microwaves. If the organic solvent is insufficiently removed in this process, the next curing process may produce a composition in an uncured state or with poor thermo-mechanical properties.

After the organic solvent is removed, a curing reaction of the paste composition is allowed to proceed by heat treatment, photoirradiation or the like, according to the mechanism of curing of the compound A or the resin in the paste composition used. In this case, different processes may be combined in order to allow the curing to completely proceed, for example, heat treatment may be performed after photoirradiation. In an environment at 100° C. or higher, heat treatment is preferably performed under an inert atmosphere such as nitrogen so that oxidation of the polymer can be inhibited. Also when the composition is cured by photoirradiation using a polymerization initiator capable of producing radicals, whose activity may be quenched by oxygen, the treatment is preferably performed under an inert atmosphere such as nitrogen, so that the polymerization is not inhibited.

When photolithographic patterning is performed, the process may include first applying the paste composition to a substrate, removing the organic solvent, and then applying light corresponding to the curing wavelength band of the paste composition through a mask that is designed to allow light to pass through a necessary portion corresponding to a certain pattern. The light source may be an ultra-high pressure mercury vapor lamp, a metal halide lamp, a halogen lamp, a helium-neon laser, a YAG laser, or the like. An exposure system such as an ultra-high pressure mercury vapor lamp exposure system PEM-6M (manufactured by UNION OPTICAL CO., LTD.) may be used. When the mechanism of curing of the paste composition is radical polymerization, exposure to light is preferably performed under a nitrogen atmosphere so that radical reaction species can be prevented from being deactivated by oxidation. In order to increase the resolution of the pattern, light applied in the exposure system should preferably have a high degree of parallelization. Also, in order to reduce the influence of diffracted light caused by the mask, the mask should preferably be in contact with the substrate, or the gap between the mask and the substrate should preferably be reduced.

During exposure, applied light can be scattered inside the paste composition after drying so that the pattern edge can be distorted. For this case, a UV absorber is preferably added to the paste composition so that the UV absorber can absorb faint light leaking from the exposed area to prevent scattering, which can keep the pattern edge sharp. After drying, scattering inside the paste composition is mainly caused by Rayleigh scattering from the barium sulfate particles. The shorter the wavelength of light, the larger the scattering. Therefore, a UV absorber capable of selectively absorbing short-wavelength light is also preferably used. A filter to cut short-wavelength light may also be placed between the light source and the mask so that scattering can be prevented.

In order to allow the curing reaction to further proceed after the exposure, the substrate may be stored at room temperature for a certain period of time, or heat treatment may be performed.

After the exposure process, the substrate may be immersed in a developing solution so that the paste composition can be removed from the non-exposed area. The substrate on which the patterned cured material is formed may be washed and dried. Heat treatment may be further performed to allow the curing reaction to proceed.

The paste composition or the cured material according to the present invention is preferably used to form optical waveguides. Optical waveguides are formed on circuit boards for electrical appliances and so on and have the function of transmitting optical signals between ICs mounted on the boards. An optical waveguide includes a core to transmit optical signals and a cladding surrounding the core and having a refractive index lower than that of the core. FIGS. 1 and 2 show a channel optical waveguide structure and a slab optical waveguide structure, respectively. The channel optical waveguide has a structure including a linear core 1 and a cladding 2 surrounding the periphery of the core 1. The slab optical waveguide has a structure including a layer core 1 and layer claddings 2 with which the upper and lower sides of the core 1 are covered. The paste composition of the present invention may be used to form both or one of the core and the cladding.

Patterning by photoirradiation is possible with the paste composition of the present invention. Therefore, the paste composition of the present invention is preferably used as a core-forming material so that various shapes of optical waveguides can be easily produced. There is preferably a large difference between the refractive indices of the core and the cladding, so that the transmitted light-trapping effect can be high.

The refractive indices and the thicknesses of the cladding and the core in an optical waveguide may be arbitrarily selected depending on the design of the optical waveguide. In the case of a multimode optical waveguide, it is appropriate that the difference between the refractive indices of the core and the cladding should be large and that the core should be made thick. In the case of a single mode optical waveguide, the difference between the refractive indices of the core and the cladding should be small, and the core should be made thin so that single mode transmission can be achieved.

For example, the channel optical waveguide may be manufactured by the method described below. The paste composition for forming an under-cladding is applied to a substrate such as a glass substrate, a silicon wafer, a glass epoxy substrate, or a plastic film. The coating is dried and cured to form an under-cladding. The paste composition for forming a core is then applied to the under-cladding, and the coating is dried to form a film-shaped core. The film-shaped core is then patterned into a waveguide. When the paste composition for forming the core is polymerized by photoirradiation, the patterning may be performed by photolithographic method. Alternatively, when the paste composition for forming the core is polymerized by heat, the patterning may be performed by reactive ion etching or the like. The paste composition for forming an over-cladding is then applied to the core, and the coating is dried and cured to form an over-cladding.

Examples of the method for forming the coating film include, but are not limited to, methods using a spinner, screen printing, a blade coater, a die coater, or any other coating devices.

EXAMPLES

The present invention is more specifically described with some examples below which are not intended to limit the scope of the invention. Some chemical compounds used in the examples are abbreviated as follows: DMAc, N,N-dimethylacetamide; THFA, tetrahydrofurfuryl alcohol.

The properties of each of dispersion solutions of barium sulfate particles, cured materials produced from paste compositions, and optical waveguides were measured by the methods described below.

Method for Measuring the Refractive Index of Cured Materials Produced from Paste Compositions The refractive index of a film-shaped cured material produced from a paste composition was determined using Prism Coupler 2010 manufactured by Metricon Corporation at a wavelength of 850 nm and a temperature of 25° C. The refractive index was also measured with this equipment at 40° C., 60° C., 80° C., and 100° C. The slope of the four points was obtained by a least-squares method, and a temperature-dependent change in the refractive index (temperature dependency of the refractive index) was calculated.

Method for Measuring Optical Propagation Loss of Optical Waveguide

The measurement was performed by the cut-back method according to the JPCA standard (JPCA-PE02-05-01S-2004). Multimode optical fibers each with a core diameter of 50 μm and a numerical aperture of 0.28 were used on the input and output sides. The measurement temperature was 23° C., and the wavelength of the measurement light source was 850 nm.

Method for Measuring Mean Particle Diameter of Raw Barium Sulfate Particles Agglomerated Before Dispersion Solution Preparation The measurement was performed using an optical microscope as shown below. The particles were placed on a transparent plate such as a glass plate, and the transparent plate on which the particles were placed was mounted on the observation stage of the optical microscope. Light was applied from beneath the transparent plate. The transmitted light images of the particles captured through a CCD camera ADP-240M (manufactured by FLOVEL CO., LTD.) attached instead of an eye lens to an optical microscope were stored as digital images in a computer. The spherically approximated particle diameters of any observed 100 particles were determined using an image processing software FlvFs (manufactured by FLOVEL CO., LTD.), and the number average particle diameter was calculated therefrom.

Method for Measuring Mean Particle Diameter of Barium Sulfate Particles in Dispersion Solution A drop of the dispersion solution was put on a carbon-evaporated collodion film. After the solvent was removed by drying, the barium sulfate particles were observed using a transmission electron microscope H-7100FA (manufactured by Hitachi Ltd.) at an accelerating voltage of 100 kV. The observed images were stored as digital images in a computer. The spherically approximated particle diameters of any observed 100 particles were determined using an image processing software FlvFs (manufactured by FLOVEL CO., LTD.), and the number average particle diameter was calculated therefrom. When primary particles were agglomerated, the particle diameters of the agglomerates were measured.

Method for Measuring Mean Particle Diameter of Barium Sulfate Particles in Paste Composition A drop of the paste composition was put on a carbon-evaporated collodion film. After the solvent was removed by drying, the barium sulfate particles were observed using a transmission electron microscope H-7100FA (manufactured by Hitachi Ltd.) at an accelerating voltage of 100 kV. The observed images were stored as digital images in a computer. The spherically approximated particle diameters of any observed 100 particles were determined using an image processing software FlvFs (manufactured by FLOVEL CO., LTD.), and the number average particle diameter was calculated therefrom. When primary particles were agglomerated, the particle diameters of the agglomerates were measured.

Method for Measuring Coefficient of Linear Expansion of Cured Material Produced from Paste Composition The cured material produced from the paste composition was measured for dimensional change under an indentation load of 50 mN using a TMA meter TMA/SS6100 manufactured by SSI Nano Technology Inc. in the process of heating it from room temperature to 120° C. and then cooling it to room temperature in a nitrogen atmosphere. The average coefficient of linear expansion during heating and cooling between 50° C. and 70° C. was calculated. In order to eliminate the temperature history of the coefficient of linear expansion, the heating and cooling process was sequentially repeated twice, and the result of the second measurement was used as the displacement value.

Preparation of Dispersion Solutions

Dispersion solutions A to P were prepared as described below. Barium sulfate secondary particles BF-40 (15 μm in mean secondary particle diameter, 10 nm in mean primary particle diameter, manufactured by SAKAI CHEMICAL INDUSTRY CO., LTD.), a dispersant, and an organic solvent were mixed in the respective amounts shown in Table 1, and the mixture was processed in a homogenizer EXCEL AUTO™ manufactured by NIHONSEIKI KAISHA LTD. at a rotary blade end peripheral speed of 5 m/second for 1 hour, so that the barium sulfate particles were dispersed.

The homogenized dispersion solution was subjected to a dispersion process using a bead mill ULTRA APEX MILL UAM-015 (trade name) manufactured by KOTOBUKI INDUSTRIES CO., LTD. The beads were made of zirconia and had a mean particle diameter of 0.05 mm (YTZ Ball manufactured by NIKKATO CORPORATION). The beads were charged in an amount of 400 g. The peripheral speed of the rotor of the bead mill was 9.5 m/second, and the feeding pressure was 0.1 MPa. The dispersion process time was 10 hours for dispersions A to 0 and 1 hour for dispersion P. After the dispersion process was completed, the liquid was collected so that the dispersion solution of the barium sulfate particles was obtained. Table 1 also shows the mean particle diameter of the barium sulfate particles in the dispersion solution at the end of the dispersion process.

In Table 1, HOA-MPL (trade name) and HOA-HH (trade name) manufactured by KYOEISHA CHEMICAL Co., LTD. each used as a dispersant are compounds each having a polymerizable group and a carboxyl group, LIGHT-ESTER P-1M (trade name) manufactured by KYOEISHA CHEMICAL Co., LTD. and RDX 63182 (trade name) manufactured by DAICEL-CYTEC COMPANY LTD. are phosphoric ester compounds each having a polymerizable group, and Disperbyk-111 (trade name) manufactured by BYK-Chemie Japan KK is a phosphoric ester compound having no polymerizable group.

TABLE 1

Components of Dispersion Solution

| | Amount of Barium Sulfate (g) | Dispersant *HOA-MPL and HOA-HH are compounds each having a polymerizable group and a carboxyl group, LIGHT-ESTER P-1M and RDX 63182 are phosphoric ester compounds each having a polymerizable group. (Compound A) | | Organic Solvent | | Amount of Dispersant based on 100 parts by weight of Barium Sulfate (parts by weight) | Time for Dispersion Process (h) | Mean Particle Diameter (nm) |
|---|---|---|---|---|---|---|---|---|
| | | Material | Amount (g) | Material | Amount (g) | | | |
| Dispersion Solution A | 200 | HOA-MPL | 30 | THFA | 270 | 15 | 10 | 22 |
| Dispersion Solution B | 200 | HOA-MPL | 8 | THFA | 292 | 4 | 10 | 33 |
| Dispersion Solution C | 200 | HOA-MPL | 14 | THFA | 286 | 7 | 10 | 24 |
| Dispersion Solution D | 200 | HDA-MPL | 60 | THFA | 240 | 30 | 10 | 26 |
| Dispersion Solution E | 200 | HOA-HH | 30 | THFA | 270 | 15 | 10 | 26 |
| Dispersion Solution F | 200 | HOA-HH | 8 | THFA | 292 | 4 | 10 | 37 |
| Dispersion Solution G | 200 | HOA-HH | 14 | THFA | 286 | 7 | 10 | 25 |
| Dispersion Solution H | 200 | HOA-HH | 60 | THFA | 240 | 30 | 10 | 26 |
| Dispersion Solution I | 200 | LIGHT-ESTER P-1M | 30 | DMAc | 270 | 15 | 10 | 19 |
| Dispersion Solution J | 200 | LIGHT-ESTER P-1M | 8 | DMAc | 292 | 4 | 10 | 31 |
| Dispersion Solution K | 200 | LIGHT-ESTER P-1M | 14 | DMAc | 286 | 7 | 10 | 20 |
| Dispersion Solution L | 200 | LIGHT-ESTER P-1M | 60 | DMAc | 240 | 30 | 10 | 21 |
| Dispersion Solution M | 200 | RDX 63182 | 30 | DMAc | 270 | 15 | 10 | 29 |
| Dispersion Solution N | 200 | Disperbyk-111 | 30 | DMAc | 270 | 15 | 10 | 31 |
| Dispersion Solution O | 200 | Disperbyk-111 | 10 | DMAc | 290 | 5 | 10 | 40 |
| Dispersion Solution P | 200 | HOA-MPL | 30 | THFA | 270 | 15 | 1 | 49 |

Example 1

A paste composition was prepared by mixing 9.8 g of the dispersion solution A, 5 g of a resin represented by the formula (11), 0.1 g of a UV-activatable oxime-type polymerization initiator OXE02 (manufactured by Chiba Specialty Chemicals K.K.), and 0.2 g of a silane coupling agent KBM403 (trade name, manufactured by Shin-Etsu Chemical Co., Ltd., chemical name: 3-glycidoxypropyltrimethoxysilane) in a ball mill. The content of the barium sulfate particles in the paste composition was 40% by weight based on the amount of the solid components in the paste composition, exclusive of the organic solvent. The barium sulfate particles in the paste composition had a mean particle diameter of 26 nm. The paste composition was applied to a quartz substrate with a spin coater. The coating was dried in air at 80° C. for 1 hour using an oven and then exposed to 50 mJ/cm$^2$ of ultraviolet light using an ultra-high pressure mercury vapor lamp exposure system (PEM-6M, manufactured by UNION OPTICAL CO., LTD.) so that the paste composition was cured to form a 10 μm-thick film-shaped cured material. At a wavelength of 850 nm and a temperature of 25° C., the film-shaped cured material had a refractive index of 1.556 and a temperature-dependent change rate of refractive index of 51 ppm/° C.

On the other hand, a cured material for use in evaluation of linear expansion coefficient was produced using the paste composition as described below. A Teflon (registered trademark) tape of 10 mm×10 mm was attached to a ϕ4 inch silicon wafer, and a 5 mm-long cut piece of a Teflon (registered trademark) tube with an inner diameter of 8 mm was placed thereon. The paste composition obtained as described above was charged into the Teflon (registered trademark) tube in such a manner that the liquid level reached 1 mm. Thereafter, the paste composition was dried in air at 80° C. for 1 hour using an oven and then exposed to 50 mJ/cm$^2$ of ultraviolet light using an ultra-high pressure mercury vapor lamp exposure system (PEM-6M, manufactured by UNION OPTICAL CO., LTD.) so that the paste composition was cured to form a cured material with a bottom diameter of 8 mm and a thickness of 1 mm. The resulting cured material was removed from the Teflon (registered trademark) tube, and the linear expansion coefficient of the cured material was measured in the thickness direction to be 44 ppm/° C.

In addition, an optical waveguide was produced using the paste composition as described below. A liquid epoxy resin (#314, manufactured by EPOXY TECHNOLOGY, INC.) was applied to a ϕ4 inch silicon wafer with a spin coater. The coating was dried in air at 80° C. for 1 hour using an oven and then cured by heating in nitrogen at 150° C. for 1 hour to form a 5 μm-thick under-cladding. The refractive index of the under-cladding was measured at a wavelength of 850 nm and a temperature of 25° C. to be 1.502. Thereafter, the paste composition was applied with a spin coater to the under-cladding formed on the quartz substrate, and then dried in air at 80° C. for 1 hour to form a 50 μm-thick dried paste composition film. The resulting film was exposed to 50 mJ/cm$^2$ of ultraviolet light through a quartz mask using an ultra-high pressure mercury vapor lamp exposure system (PEM-6M, manufactured by UNION OPTICAL CO., LTD.). The quartz mask had a 50 μm-wide, 9 cm-long slit, and the portion other than the slit was for blocking light. After the exposure, the substrate was immersed in a developing solution P-7G (manufactured by TOKYO OHKA KOGYO CO., LTD.) for 5 minutes so that the non-exposed film was removed. As a result, a 50 μm-wide 9 cm-long core was formed. After the development, the patterned portion had a clear rectangle shape with no cracking. No residue was observed in the non-exposed area, and the developability was good.

The same material as for the under-cladding was further applied thereto with a spin coater. The coating was dried at 80° C. for 1 hour and then cured by heating in nitrogen at 150° C. for 1 hour to form a 5 μm-thick over-cladding, so that an optical waveguide was obtained.

Both ends of the optical waveguide together with the substrate were cut using a dicing machine, and its optical propagation loss was measured to be 0.3 dB/cm.

Examples 2 to 290

Each of the paste compositions of the formulations shown in Tables 2 to 31 was prepared by the same method as that in Example 1 and then used to form a cured material for use in evaluation of physical properties and to form an optical waveguide, except that the compound A used to form the dispersion solution was further added in place of the resin in the process of preparing the paste composition in each of Examples 209 to 226. The results of the evaluation are shown in Tables 2 to 31, in which the resins A and B are represented by the formulae (11) and (12), respectively, and the chemical name of the silane coupling agent KBM503 (trade name) manufactured by Shin-Etsu Chemical Co., Ltd. is 3-methacryloxypropyltrimethoxysilane.

In some examples, a thin film-like residue was present on the surface of the substrate in the non-exposed area after the development in the process of forming the optical waveguide. In such cases, the comment "residue present in non-exposed area" is entered in the section of Developability in Tables 2 to 31. In some examples, a cracked portion or portions were observed in the core after the development in the process of forming the optical waveguide. In such cases, the comment "cracking of core" is entered in the section of Developability in Tables 2 to 31.

TABLE 2

| | Components of Paste Composition | | | | | | | | |
|---|---|---|---|---|---|---|---|---|---|
| | Dispersion Solution | | Resin | | Polymerization Initiator | | Silane Coupling Agent | | Content of Barium Sulfate based on Amount of Solid Components (% by weight) | Content of Compoound A and Resin based on Amount of Solid Components (% by weight) |
| Sample | Amount (g) | Material | Amount (g) | Material | Amount (g) | Material | Amount (g) | | |
| Example 1 | Dispersion Solution A | 9.8 | Resin A | 5 | OXE02 | 0.1 | KBM403 | 0.2 | 40 | 57 |
| Example 2 | Dispersion Solution A | 2.4 | Resin A | 5 | OXE02 | 0.1 | KBM403 | 0.2 | 15 | 80 |
| Example 3 | Dispersion Solution A | 3.4 | Resin A | 5 | OXE02 | 0.1 | KBM403 | 0.2 | 20 | 76 |
| Example 4 | Dispersion Solution A | 15.4 | Resin A | 3 | OXE02 | 0.06 | KBM403 | 0.12 | 60 | 38 |
| Example 5 | Dispersion Solution A | 26.5 | Resin A | 1 | OXE02 | 0.02 | KBM403 | 0.04 | 80 | 20 |

TABLE 2-continued

| | Components of Paste Compositon | | | | | | | | |
|---|---|---|---|---|---|---|---|---|---|
| | Dispersion Solution | | Resin | | Polymerization Initiator | | Silane Coupling Agent | | Content of Barium Sulfate based on Amount of Solid | Content of Compoound A and Resin based on Amount of Solid |
| | Sample | Amount (g) | Material | Amount (g) | Material | Amount (g) | Material | Amount (g) | Components (% by weight) | Components (% by weight) |
| Example 6 | Dispersion Solution A | 50.1 | Resin A | 0.5 | OXE02 | 0.01 | KBM403 | 0.02 | 85 | 15 |
| Example 7 | Dispersion Solution B | 9.1 | Resin A | 5 | OXE02 | 0.1 | KBM403 | 0.2 | 40 | 57 |
| Example 8 | Dispersion Solution B | 2.3 | Resin A | 5 | OXE02 | 0.1 | KBM403 | 0.2 | 15 | 81 |
| Example 9 | Dispersion Solution B | 3.3 | Resin A | 5 | OXE02 | 0.1 | KBM403 | 0.2 | 20 | 76 |
| Example 10 | Dispersion Solution B | 12.7 | Resin A | 3 | OXE02 | 0.06 | KBM403 | 0.12 | 60 | 37 |
| Example 11 | Dispersion Solution B | 12.6 | Resin A | 1 | OXE02 | 0.02 | KBM403 | 0.04 | 80 | 18 |
| Example 12 | Dispersion Solution B | 9.7 | Resin A | 0.5 | OXE02 | 0.01 | KBM403 | 0.02 | 85 | 14 |
| Example 13 | Dispersion Solution C | 9.3 | Resin A | 5 | OXE02 | 0.1 | KBM403 | 0.2 | 40 | 57 |
| Example 14 | Dispersion Solution C | 2.4 | Resin A | 5 | OXE02 | 0.1 | KBM403 | 0.2 | 15 | 80 |
| Example 15 | Dispersion Solution C | 3.4 | Resin A | 5 | OXE02 | 0.1 | KBM403 | 0.2 | 20 | 75 |
| Example 16 | Dispersion Solution C | 13.3 | Resin A | 3 | OXE02 | 0.06 | KBM403 | 0.12 | 60 | 38 |
| Example 17 | Dispersion Solution C | 14.7 | Resin A | 1 | OXE02 | 0.02 | KBM403 | 0.04 | 80 | 20 |
| Example 18 | Dispersion Solution C | 12.4 | Resin A | 0.5 | OXE02 | 0.01 | KBM403 | 0.02 | 85 | 15 |
| Example 19 | Dispersion Solution D | 11.0 | Resin A | 5 | OXE02 | 0.1 | KBM403 | 0.2 | 40 | 57 |
| Example 20 | Dispersion Solution D | 2.5 | Resin A | 5 | OXE02 | 0.1 | KBM403 | 0.2 | 15 | 81 |
| Example 21 | Dispersion Solution D | 3.6 | Resin A | 5 | OXE02 | 0.1 | KBM403 | 0.2 | 20 | 76 |
| Example 22 | Dispersion Solution D | 21.7 | Resin A | 3 | OXE02 | 0.06 | KBM403 | 0.12 | 60 | 39 |

TABLE 3

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 1 | 26 | 1.556 | 51 | 44 | good | 0.3 |
| Example 2 | 23 | 1.552 | 56 | 52 | good | 0.3 |
| Example 3 | 25 | 1.553 | 55 | 51 | good | 0.3 |
| Example 4 | 27 | 1.562 | 44 | 37 | good | 0.3 |
| Example 5 | 29 | 1.572 | 31 | 24 | good | 0.4 |
| Example 6 | 32 | 1.575 | 25 | 18 | Residue present in non-exposed area, Cracking of core | 0.5 |
| Example 7 | 37 | 1.558 | 52 | 46 | good | 0.6 |
| Example 8 | 35 | 1.552 | 57 | 52 | good | 0.5 |
| Example 9 | 35 | 1.553 | 56 | 50 | good | 0.6 |
| Example 10 | 36 | 1.566 | 44 | 36 | good | 0.6 |
| Example 11 | 39 | 1.578 | 33 | 25 | good | 0.7 |
| Example 12 | 42 | 1.583 | 26 | 17 | Residue present in non-exposed area, Cracking of core | 0.8 |
| Example 13 | 25 | 1.558 | 49 | 44 | good | 0.3 |
| Example 14 | 24 | 1.552 | 55 | 51 | good | 0.3 |
| Example 15 | 25 | 1.553 | 56 | 51 | good | 0.3 |
| Example 16 | 27 | 1.565 | 44 | 37 | good | 0.3 |
| Example 17 | 29 | 1.577 | 30 | 23 | good | 0.4 |
| Example 18 | 31 | 1.581 | 24 | 18 | Residue present in non-exposed area, Cracking of core | 0.5 |
| Example 19 | 27 | 1.554 | 52 | 43 | good | 0.5 |
| Example 20 | 25 | 1.551 | 55 | 51 | good | 0.4 |
| Example 21 | 25 | 1.552 | 55 | 51 | good | 0.5 |
| Example 22 | 27 | 1.557 | 43 | 37 | good | 0.6 |

TABLE 4

Components of Paste Composition

| | Dispersion Solution | | Resin | | Polymerization Initiator | | Silane Coupling Agent | | Content of Barium Sulfate based on Amount of Solid | Content of Compoound A and Resin based on Amount of Solid |
|---|---|---|---|---|---|---|---|---|---|---|
| | Sample | Amount (g) | Material | Amount (g) | Material | Amount (g) | Material | Amount (g) | Components (% by weight) | Components (% by weight) |
| Example 23 | Dispersion Solution A | 9.8 | Resin A | 5 | OXE02 | 0.1 | KBM503 | 0.2 | 40 | 57 |
| Example 24 | Dispersion Solution A | 2.4 | Resin A | 5 | OXE02 | 0.1 | KBM503 | 0.2 | 15 | 80 |
| Example 25 | Dispersion Solution A | 3.4 | Resin A | 5 | OXE02 | 0.1 | KBM503 | 0.2 | 20 | 76 |
| Example 26 | Dispersion Solution A | 15.4 | Resin A | 3 | OXE02 | 0.06 | KBM503 | 0.12 | 60 | 38 |
| Example 27 | Dispersion Solution A | 26.5 | Resin A | 1 | OXE02 | 0.02 | KBM503 | 0.04 | 80 | 20 |
| Example 28 | Dispersion Solution A | 50.1 | Resin A | 0.5 | OXE02 | 0.01 | KBM503 | 0.02 | 85 | 15 |
| Example 29 | Dispersion Solution B | 9.1 | Resin A | 5 | OXE02 | 0.1 | KBM503 | 0.2 | 40 | 57 |
| Example 30 | Dispersion Solution C | 9.3 | Resin A | 5 | OXE02 | 0.1 | KBM503 | 0.2 | 40 | 57 |
| Example 31 | Dispersion Solution D | 11.0 | Resin A | 5 | OXE02 | 0.1 | KBM503 | 0.2 | 40 | 57 |
| Example 32 | Dispersion Solution A | 9.4 | Resin A | 5 | OXE02 | 0.1 | none | none | 40 | 59 |
| Example 33 | Dispersion Solution A | 2.3 | Resin A | 5 | OXE02 | 0.1 | none | none | 15 | 83 |
| Example 34 | Dispersion Solution A | 3.3 | Resin A | 5 | OXE02 | 0.1 | none | none | 20 | 79 |
| Example 35 | Dispersion Solution A | 14.8 | Resin A | 3 | OXE02 | 0.06 | none | none | 60 | 39 |
| Example 36 | Dispersion Solution A | 25.5 | Resin A | 1 | OXE02 | 0.02 | none | none | 80 | 20 |
| Example 37 | Dispersion Solution A | 48.2 | Resin A | 0.5 | OXE02 | 0.01 | none | none | 85 | 15 |
| Example 38 | Dispersion Solution B | 8.7 | Resin A | 5 | OXE02 | 0.1 | none | none | 40 | 59 |
| Example 39 | Dispersion Solution B | 2.2 | Resin A | 5 | OXE02 | 0.1 | none | none | 15 | 84 |
| Example 40 | Dispersion Solution B | 3.2 | Resin A | 5 | OXE02 | 0.1 | none | none | 20 | 79 |
| Example 41 | Dispersion Solution B | 12.2 | Resin A | 3 | OXE02 | 0.06 | none | none | 60 | 39 |
| Example 42 | Dispersion Solution B | 12.1 | Resin A | 1 | OXE02 | 0.02 | none | none | 80 | 20 |
| Example 43 | Dispersion Solution B | 9.3 | Resin A | 0.5 | OXE02 | 0.01 | none | none | 85 | 14 |
| Example 44 | Dispersion Solution C | 8.9 | Resin A | 5 | OXE02 | 0.1 | none | none | 40 | 59 |
| Example 45 | Dispersion Solution C | 2.3 | Resin A | 5 | OXE02 | 0.1 | none | none | 15 | 83 |
| Example 46 | Dispersion Solution C | 3.3 | Resin A | 5 | OXE02 | 0.1 | none | none | 20 | 78 |
| Example 47 | Dispersion Solution C | 12.8 | Resin A | 3 | OXE02 | 0.06 | none | none | 60 | 39 |
| Example 48 | Dispersion Solution C | 14.2 | Resin A | 1 | OXE02 | 0.02 | none | none | 80 | 20 |
| Example 49 | Dispersion Solution C | 12.0 | Resin A | 0.5 | OXE02 | 0.01 | none | none | 85 | 15 |

TABLE 5

Results

| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
|---|---|---|---|---|---|---|
| Example 23 | 27 | 1.556 | 50 | 42 | good | 0.3 |
| Example 24 | 24 | 1.552 | 55 | 52 | good | 0.3 |
| Example 25 | 26 | 1.553 | 55 | 52 | good | 0.3 |
| Example 26 | 27 | 1.562 | 43 | 38 | good | 0.3 |
| Example 27 | 29 | 1.572 | 31 | 25 | good | 0.4 |
| Example 28 | 33 | 1.578 | 24 | 19 | Residue present in non-exposed area, Cracking of core | 0.5 |
| Example 29 | 35 | 1.558 | 51 | 44 | good | 0.6 |
| Example 30 | 25 | 1.558 | 53 | 41 | good | 0.3 |
| Example 31 | 25 | 1.554 | 53 | 42 | good | 0.5 |
| Example 32 | 25 | 1.556 | 51 | 42 | good | 0.4 |
| Example 33 | 22 | 1.552 | 55 | 51 | good | 0.3 |
| Example 34 | 25 | 1.553 | 54 | 50 | good | 0.3 |
| Example 35 | 26 | 1.562 | 44 | 37 | good | 0.4 |
| Example 36 | 30 | 1.572 | 32 | 24 | Cracking of core | 0.4 |
| Example 37 | 31 | 1.578 | 24 | 18 | Residue present in non-exposed area, Cracking of core | 0.5 |
| Example 38 | 36 | 1.558 | 51 | 43 | good | 0.6 |
| Example 39 | 35 | 1.552 | 56 | 52 | good | 0.5 |
| Example 40 | 36 | 1.553 | 56 | 51 | good | 0.6 |
| Example 41 | 36 | 1.566 | 43 | 36 | good | 0.6 |
| Example 42 | 36 | 1.578 | 31 | 22 | Cracking of core | 0.7 |
| Example 43 | 41 | 1.583 | 25 | 17 | Residue present in non-exposed area, Cracking of core | 0.8 |

TABLE 5-continued

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 44 | 25 | 1.558 | 52 | 43 | good | 0.4 |
| Example 45 | 25 | 1.552 | 56 | 51 | good | 0.3 |
| Example 46 | 24 | 1.553 | 55 | 51 | good | 0.3 |
| Example 47 | 26 | 1.565 | 43 | 37 | good | 0.4 |
| Example 48 | 29 | 1.577 | 31 | 24 | Cracking of core | 0.4 |
| Example 49 | 33 | 1.581 | 24 | 18 | Residue present in non-exposed area, Cracking of core | 0.5 |

TABLE 6

| | Components of Paste Composition | | | | | | | | |
|---|---|---|---|---|---|---|---|---|---|
| | Dispersion Solution | | Resin | | Polymerization Initiator | | Silane Coupling Agent | | Content of Barium Sulfate based on Amount of Solid Components (% by weight) | Content of Compoound A and Resin based on Amount of Solid Components (% by weight) |
| | Sample | Amount (g) | Material | Amount (g) | Material | Amount (g) | Material | Amount (g) | | |
| Example 50 | Dispersion Solution D | 10.6 | Resin A | 5 | OXE02 | 0.1 | none | none | 40 | 59 |
| Example 51 | Dispersion Solution D | 2.4 | Resin A | 5 | OXE02 | 0.1 | none | none | 15 | 84 |
| Example 52 | Dispersion Solution D | 3.5 | Resin A | 5 | OXE02 | 0.1 | none | none | 20 | 78 |
| Example 53 | Dispersion Solution D | 20.9 | Resin A | 3 | OXE02 | 0.06 | none | none | 60 | 40 |
| Example 54 | Dispersion Solution E | 9.8 | Resin A | 5 | OXE02 | 0.1 | KBM403 | 0.2 | 40 | 57 |
| Example 55 | Dispersion Solution E | 2.4 | Resin A | 5 | OXE02 | 0.1 | KBM403 | 0.2 | 15 | 80 |
| Example 56 | Dispersion Solution E | 3.4 | Resin A | 5 | OXE02 | 0.1 | KBM403 | 0.2 | 20 | 76 |
| Example 57 | Dispersion Solution E | 15.4 | Resin A | 3 | OXE02 | 0.06 | KBM403 | 0.12 | 60 | 38 |
| Example 58 | Dispersion Solution E | 26.5 | Resin A | 1 | OXE02 | 0.02 | KBM403 | 0.04 | 80 | 20 |
| Example 59 | Dispersion Solution E | 50.1 | Resin A | 0.5 | OXE02 | 0.01 | KBM403 | 0.02 | 85 | 15 |
| Example 60 | Dispersion Solution F | 9.1 | Resin A | 5 | OXE02 | 0.1 | KBM403 | 0.2 | 40 | 57 |
| Example 61 | Dispersion Solution G | 9.3 | Resin A | 5 | OXE02 | 0.1 | KBM403 | 0.2 | 40 | 57 |
| Example 62 | Dispersion Solution H | 11.0 | Resin A | 5 | OXE02 | 0.1 | KBM403 | 0.2 | 40 | 57 |
| Example 63 | Dispersion Solution E | 9.4 | Resin A | 5 | OXE02 | 0.1 | none | none | 40 | 59 |
| Example 64 | Dispersion Solution E | 2.3 | Resin A | 5 | OXE02 | 0.1 | none | none | 15 | 83 |
| Example 65 | Dispersion Solution E | 3.3 | Resin A | 5 | OXE02 | 0.1 | none | none | 20 | 79 |
| Example 66 | Dispersion Solution E | 14.8 | Resin A | 3 | OXE02 | 0.06 | none | none | 60 | 39 |
| Example 67 | Dispersion Solution E | 25.5 | Resin A | 1 | OXE02 | 0.02 | none | none | 80 | 20 |
| Example 68 | Dispersion Solution E | 48.2 | Resin A | 0.5 | OXE02 | 0.01 | none | none | 85 | 15 |
| Example 69 | Dispersion Solution F | 8.7 | Resin A | 5 | OXE02 | 0.1 | none | none | 40 | 59 |
| Example 70 | Dispersion Solution G | 8.9 | Resin A | 5 | OXE02 | 0.1 | none | none | 40 | 59 |
| Example 71 | Dispersion Solution H | 10.6 | Resin A | 5 | OXE02 | 0.1 | none | none | 40 | 59 |

TABLE 7

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 50 | 24 | 1.554 | 51 | 43 | good | 0.5 |
| Example 51 | 23 | 1.551 | 56 | 51 | good | 0.4 |
| Example 52 | 24 | 1.552 | 55 | 51 | good | 0.5 |
| Example 53 | 26 | 1.557 | 43 | 37 | good | 0.6 |
| Example 54 | 30 | 1.553 | 52 | 44 | good | 0.5 |
| Example 55 | 29 | 1.551 | 56 | 51 | good | 0.3 |
| Example 56 | 30 | 1.551 | 55 | 51 | good | 0.4 |
| Example 57 | 31 | 1.555 | 43 | 38 | good | 0.5 |
| Example 58 | 34 | 1.560 | 33 | 25 | good | 0.5 |
| Example 59 | 39 | 1.561 | 27 | 20 | Residue present in | 0.6 |

TABLE 7-continued

| | Results | | | | | |
|---|---|---|---|---|---|---|
| | Mean Particle Diameter in Paste Composition (nm) | Refractive Index | Temperature Dependency of the Refractive Index (ppm/° C.) | Coefficient of Linear Expansion (ppm/° C.) | Developability | Optical Propagation Loss (dB/cm) |
| | | | | | non-exposed area, Cracking of core | |
| Example 60 | 42 | 1.557 | 51 | 43 | good | 0.7 |
| Example 61 | 33 | 1.556 | 51 | 44 | good | 0.5 |
| Example 62 | 32 | 1.547 | 50 | 44 | good | 0.6 |
| Example 63 | 29 | 1.553 | 52 | 43 | good | 0.5 |
| Example 64 | 30 | 1.551 | 55 | 52 | good | 0.3 |
| Example 65 | 29 | 1.551 | 54 | 51 | good | 0.4 |
| Example 66 | 30 | 1.555 | 44 | 36 | good | 0.5 |
| Example 67 | 33 | 1.560 | 31 | 24 | Cracking of core | 0.5 |
| Example 68 | 40 | 1.561 | 25 | 18 | Residue present in non-exposed area, Cracking of core | 0.6 |
| Example 69 | 43 | 1.557 | 51 | 43 | good | 0.7 |
| Example 70 | 31 | 1.556 | 51 | 43 | good | 0.5 |
| Example 71 | 31 | 1.547 | 52 | 44 | good | 0.6 |

TABLE 8

| | Components of Paste Composition | | | | | | | | |
|---|---|---|---|---|---|---|---|---|---|
| | Dispersion Solution | | Resin | | Polymerization Initiator | | Silane Coupling Agent | | Content of Barium Sulfate based on Amount of Solid Components (% by weight) | Content of Compoound A and Resin based on Amount of Solid Components (% by weight) |
| | Sample | Amount (g) | Material | Amount (g) | Material | Amount (g) | Material | Amount (g) | | |
| Example 72 | Dispersion Solution A | 9.8 | Resin B | 5 | OXE02 | 0.1 | KBM403 | 0.2 | 40 | 57 |
| Example 73 | Dispersion Solution A | 2.4 | Resin B | 5 | OXE02 | 0.1 | KBM403 | 0.2 | 15 | 80 |
| Example 74 | Dispersion Solution A | 3.4 | Resin B | 5 | OXE02 | 0.1 | KBM403 | 0.2 | 20 | 76 |
| Example 75 | Dispersion Solution A | 15.4 | Resin B | 3 | OXE02 | 0.06 | KBM403 | 0.12 | 60 | 38 |
| Example 76 | Dispersion Solution A | 26.5 | Resin B | 1 | OXE02 | 0.02 | KBM403 | 0.04 | 80 | 20 |
| Example 77 | Dispersion Solution A | 50.1 | Resin B | 0.5 | OXE02 | 0.01 | KBM403 | 0.02 | 85 | 15 |
| Example 78 | Dispersion Solution B | 9.1 | Resin B | 5 | OXE02 | 0.1 | KBM403 | 0.2 | 40 | 57 |
| Example 79 | Dispersion Solution C | 9.3 | Resin B | 5 | OXE02 | 0.1 | KBM403 | 0.2 | 40 | 57 |
| Example 80 | Dispersion Solution D | 11.0 | Resin B | 5 | OXE02 | 0.1 | KBM403 | 0.2 | 40 | 57 |
| Example 81 | Dispersion Solution A | 9.4 | Resin B | 5 | OXE02 | 0.1 | none | none | 40 | 59 |
| Example 82 | Dispersion Solution A | 2.3 | Resin B | 5 | OXE02 | 0.1 | none | none | 15 | 83 |
| Example 83 | Dispersion Solution A | 3.3 | Resin B | 5 | OXE02 | 0.1 | none | none | 20 | 79 |
| Example 84 | Dispersion Solution A | 14.8 | Resin B | 3 | OXE02 | 0.06 | none | none | 60 | 39 |
| Example 85 | Dispersion Solution A | 25.5 | Resin B | 1 | OXE02 | 0.02 | none | none | 80 | 20 |
| Example 86 | Dispersion Solution A | 48.2 | Resin B | 0.5 | OXE02 | 0.01 | none | none | 85 | 15 |
| Example 87 | Dispersion Solution B | 8.7 | Resin B | 5 | OXE02 | 0.1 | none | none | 40 | 59 |
| Example 88 | Dispersion Solution C | 8.9 | Resin B | 5 | OXE02 | 0.1 | none | none | 40 | 59 |
| Example 89 | Dispersion Solution D | 10.6 | Resin B | 5 | OXE02 | 0.1 | none | none | 40 | 59 |

TABLE 9

| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
|---|---|---|---|---|---|---|
| Example 72 | 25 | 1.566 | 50 | 37 | good | 0.4 |
| Example 73 | 23 | 1.563 | 54 | 45 | good | 0.3 |
| Example 74 | 24 | 1.563 | 53 | 43 | good | 0.3 |
| Example 75 | 25 | 1.566 | 44 | 27 | Residue present in non-exposed area | 0.4 |
| Example 76 | 29 | 1.574 | 32 | 16 | Residue present in non-exposed area | 0.4 |
| Example 77 | 33 | 1.576 | 24 | 12 | Residue present in non-exposed area, Cracking of core | 0.5 |
| Example 78 | 36 | 1.568 | 48 | 32 | good | 0.6 |
| Example 79 | 25 | 1.568 | 49 | 35 | good | 0.4 |
| Example 80 | 27 | 1.562 | 52 | 35 | good | 0.5 |
| Example 81 | 23 | 1.566 | 51 | 35 | Residue present in non-exposed area | 0.4 |
| Example 82 | 23 | 1.563 | 53 | 43 | good | 0.3 |
| Example 83 | 24 | 1.563 | 53 | 43 | good | 0.3 |
| Example 84 | 25 | 1.566 | 43 | 28 | Residue present in non-exposed area | 0.5 |
| Example 85 | 28 | 1.574 | 32 | 16 | Residue present in non-exposed area, Cracking of core | 0.5 |
| Example 86 | 32 | 1.576 | 23 | 12 | Residue present in non-exposed area, Cracking of core | 0.6 |
| Example 87 | 34 | 1.568 | 49 | 31 | Residue present in non-exposed area | 0.7 |
| Example 88 | 25 | 1.568 | 50 | 35 | Residue present in non-exposed area | 0.4 |
| Example 89 | 27 | 1.562 | 51 | 33 | Residue present in non-exposed area | 0.5 |

TABLE 10

| | Components of Paste Compositon | | | | | | | | Content of Barium Sulfate based on Amount of Solid Components (% by weight) | Content of Compoound A and Resin based on Amount of Solid Components (% by weight) |
|---|---|---|---|---|---|---|---|---|---|---|
| | Dispersion Solution | | Resin | | Polymerization Initiator | | Silane Coupling Agent | | | |
| | Sample | Amount (g) | Material | Amount (g) | Material | Amount (g) | Material | Amount (g) | | |
| Example 90 | Dispersion Solution E | 9.8 | Resin B | 5 | OXE02 | 0.1 | KBM403 | 0.2 | 40 | 57 |
| Example 91 | Dispersion Solution E | 2.4 | Resin B | 5 | OXE02 | 0.1 | KBM403 | 0.2 | 15 | 80 |
| Example 92 | Dispersion Solution E | 3.4 | Resin B | 5 | OXE02 | 0.1 | KBM403 | 0.2 | 20 | 76 |
| Example 93 | Dispersion Solution E | 26.5 | Resin B | 1 | OXE02 | 0.02 | KBM403 | 0.04 | 80 | 20 |
| Example 94 | Dispersion Solution E | 50.1 | Resin B | 0.5 | OXE02 | 0.01 | KBM403 | 0.02 | 85 | 15 |
| Example 95 | Dispersion Solution F | 9.1 | Resin B | 5 | OXE02 | 0.1 | KBM403 | 0.2 | 40 | 57 |
| Example 96 | Dispersion Solution G | 9.3 | Resin B | 5 | OXE02 | 0.1 | KBM403 | 0.2 | 40 | 57 |
| Example 97 | Dispersion Solution H | 11.0 | Resin B | 5 | OXE02 | 0.1 | KBM403 | 0.2 | 40 | 57 |
| Example 98 | Dispersion Solution E | 9.4 | Resin B | 5 | OXE02 | 0.1 | none | none | 40 | 59 |
| Example 99 | Dispersion Solution E | 2.3 | Resin B | 5 | OXE02 | 0.1 | none | none | 15 | 83 |
| Example 100 | Dispersion Solution E | 3.3 | Resin B | 5 | OXE02 | 0.1 | none | none | 20 | 79 |
| Example 101 | Dispersion Solution E | 25.5 | Resin B | 1 | OXE02 | 0.02 | none | none | 80 | 20 |
| Example 102 | Dispersion Solution E | 48.2 | Resin B | 0.5 | OXE02 | 0.01 | none | none | 85 | 15 |
| Example 103 | Dispersion Solution F | 8.7 | Resin B | 5 | OXE02 | 0.1 | none | none | 40 | 59 |
| Example 104 | Dispersion Solution G | 8.9 | Resin B | 5 | OXE02 | 0.1 | none | none | 40 | 59 |
| Example 105 | Dispersion Solution H | 10.6 | Resin B | 5 | OXE02 | 0.1 | none | none | 40 | 59 |

TABLE 11

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 90 | 30 | 1.555 | 52 | 38 | good | 0.5 |
| Example 91 | 30 | 1.562 | 54 | 44 | good | 0.3 |
| Example 92 | 29 | 1.562 | 53 | 41 | good | 0.4 |
| Example 93 | 35 | 1.562 | 34 | 18 | Residue present in non-exposed area | 0.5 |
| Example 94 | 40 | 1.562 | 26 | 13 | Residue present in non-exposed area, Cracking of core | 0.6 |
| Example 95 | 42 | 1.567 | 51 | 36 | good | 0.7 |
| Example 96 | 32 | 1.566 | 51 | 38 | good | 0.5 |
| Example 97 | 33 | 1.555 | 53 | 39 | good | 0.6 |
| Example 98 | 29 | 1.555 | 53 | 37 | Residue present in non-exposed area | 0.5 |
| Example 99 | 29 | 1.562 | 55 | 44 | good | 0.3 |
| Example 100 | 30 | 1.562 | 54 | 42 | good | 0.4 |
| Example 101 | 34 | 1.562 | 33 | 15 | Residue present in non-exposed area, Cracking of core | 0.6 |
| Example 102 | 39 | 1.562 | 24 | 12 | Residue present in non-exposed area, Cracking of core | 0.7 |
| Example 103 | 43 | 1.567 | 48 | 35 | Residue present in non-exposed area | 0.8 |
| Example 104 | 33 | 1.566 | 49 | 37 | Residue present in non-exposed area | 0.5 |
| Example 105 | 31 | 1.555 | 51 | 37 | Residue present in non-exposed area | 0.6 |

TABLE 12

| | Components of Paste Compositon | | | | | | | | | | |
|---|---|---|---|---|---|---|---|---|---|---|---|
| | Dispersion Solution | | Resin | | Polymerization Initiator | | Silane Coupling Agent | | Content of Barium Sulfate based on Amount of Solid | Content of Compoound A and Resin based on Amount of Solid |
| Sample | | Amount (g) | Material | Amount (g) | Material | Amount (g) | Material | Amount (g) | Components (% by weight) | Components (% by weight) |
| Example 106 | Dispersion Solution A | 9.8 | Resin A Resin B | 2.5 2.5 | OXE02 | 0.1 | KBM403 | 0.2 | 40 | 57 |
| Example 107 | Dispersion Solution A | 2.4 | Resin A Resin B | 2.5 2.5 | OXE02 | 0.1 | KBM403 | 0.2 | 15 | 80 |
| Example 108 | Dispersion Solution A | 3.4 | Resin A Resin B | 2.5 2.5 | OXE02 | 0.1 | KBM403 | 0.2 | 20 | 76 |
| Example 109 | Dispersion Solution A | 15.4 | Resin A Resin B | 1.5 1.5 | OXE02 | 0.06 | KBM403 | 0.12 | 60 | 38 |
| Example 110 | Dispersion Solution A | 26.5 | Resin A Resin B | 0.5 0.5 | OXE02 | 0.02 | KBM403 | 0.04 | 80 | 20 |
| Example 111 | Dispersion Solution A | 50.1 | Resin A Resin B | 0.25 0.25 | OXE02 | 0.01 | KBM403 | 0.02 | 85 | 15 |
| Example 112 | Dispersion Solution B | 9.1 | Resin A Resin B | 2.5 2.5 | OXE02 | 0.1 | KBM403 | 0.2 | 40 | 57 |
| Example 113 | Dispersion Solution B | 2.3 | Resin A Resin B | 2.5 2.5 | OXE02 | 0.1 | KBM403 | 0.2 | 15 | 81 |
| Example 114 | Dispersion Solution B | 3.3 | Resin A Resin B | 2.5 2.5 | OXE02 | 0.1 | KBM403 | 0.2 | 20 | 76 |
| Example 115 | Dispersion Solution B | 12.7 | Resin A Resin B | 1.5 1.5 | OXE02 | 0.06 | KBM403 | 0.12 | 60 | 37 |
| Example 116 | Dispersion Solution B | 12.6 | Resin A Resin B | 0.5 0.5 | OXE02 | 0.02 | KBM403 | 0.04 | 80 | 18 |
| Example 117 | Dispersion Solution B | 9.7 | Resin A Resin B | 0.25 0.25 | OXE02 | 0.01 | KBM403 | 0.02 | 85 | 14 |
| Example 118 | Dispersion Solution C | 9.3 | Resin A Resin B | 2.5 2.5 | OXE02 | 0.1 | KBM403 | 0.2 | 40 | 57 |
| Example 119 | Dispersion Solution C | 2.4 | Resin A Resin B | 2.5 2.5 | OXE02 | 0.1 | KBM403 | 0.2 | 15 | 80 |

TABLE 12-continued

| | | | | | | | | | | Content of Barium Sulfate based on Amount of Solid | Content of Compoound A and Resin based on Amount of Solid |
|---|---|---|---|---|---|---|---|---|---|---|---|
| | Dispersion Solution | | Resin | | Polymerization Initiator | | Silane Coupling Agent | | | | |
| Sample | | Amount (g) | Material | Amount (g) | Material | Amount (g) | Material | Amount (g) | | Components (% by weight) | Components (% by weight) |
| Example 120 | Dispersion Solution C | 3.4 | Resin A | 2.5 | OXE02 | 0.1 | KBM403 | 0.2 | | 20 | 75 |
| | | | Resin B | 2.5 | | | | | | | |
| Example 121 | Dispersion Solution C | 13.3 | Resin A | 1.5 | OXE02 | 0.06 | KBM403 | 0.12 | | 60 | 38 |
| | | | Resin B | 1.5 | | | | | | | |
| Example 122 | Dispersion Solution C | 14.7 | Resin A | 0.5 | OXE02 | 0.02 | KBM403 | 0.04 | | 80 | 20 |
| | | | Resin B | 0.5 | | | | | | | |
| Example 123 | Dispersion Solution C | 12.4 | Resin A | 0.25 | OXE02 | 0.01 | KBM403 | 0.02 | | 85 | 15 |
| | | | Resin B | 0.25 | | | | | | | |

TABLE 13

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 106 | 25 | 1.561 | 50 | 40 | good | 0.3 |
| Example 107 | 24 | 1.557 | 55 | 48 | good | 0.3 |
| Example 108 | 26 | 1.558 | 54 | 47 | good | 0.3 |
| Example 109 | 26 | 1.565 | 42 | 33 | good | 0.3 |
| Example 110 | 27 | 1.573 | 32 | 21 | good | 0.4 |
| Example 111 | 31 | 1.576 | 25 | 16 | Residue present in non-exposed area, Cracking of core | 0.5 |
| Example 112 | 37 | 1.563 | 51 | 41 | good | 0.6 |
| Example 113 | 36 | 1.558 | 56 | 48 | good | 0.5 |
| Example 114 | 35 | 1.559 | 53 | 46 | good | 0.6 |
| Example 115 | 36 | 1.570 | 42 | 33 | good | 0.6 |
| Example 116 | 39 | 1.581 | 30 | 20 | good | 0.7 |
| Example 117 | 41 | 1.585 | 24 | 15 | Residue present in non-exposed area, Cracking of core | 0.8 |
| Example 118 | 26 | 1.563 | 51 | 40 | good | 0.3 |
| Example 119 | 24 | 1.558 | 55 | 47 | good | 0.3 |
| Example 120 | 24 | 1.559 | 55 | 47 | good | 0.3 |
| Example 121 | 26 | 1.569 | 43 | 33 | good | 0.3 |
| Example 122 | 28 | 1.579 | 31 | 21 | good | 0.4 |
| Example 123 | 30 | 1.582 | 25 | 16 | Residue present in non-exposed area, Cracking of core | 0.5 |

TABLE 14

| | | | | | | | | | | Content of Barium Sulfate based on Amount of Solid | Content of Compoound A and Resin based on Amount of Solid |
|---|---|---|---|---|---|---|---|---|---|---|---|
| | Dispersion Solution | | Resin | | Polymerization Initiator | | Silane Coupling Agent | | | | |
| Sample | | Amount (g) | Material | Amount (g) | Material | Amount (g) | Material | Amount (g) | | Components (% by weight) | Components (% by weight) |
| Example 124 | Dispersion Solution D | 11.0 | Resin A | 2.5 | OXE02 | 0.1 | KBM403 | 0.2 | | 40 | 57 |
| | | | Resin B | 2.5 | | | | | | | |
| Example 125 | Dispersion Solution D | 2.5 | Resin A | 2.5 | OXE02 | 0.1 | KBM403 | 0.2 | | 15 | 81 |
| | | | Resin B | 2.5 | | | | | | | |

TABLE 14-continued

| | | | | | | | | | | Content of Barium Sulfate based on Amount of Solid | Content of Compoound A and Resin based on Amount of Solid |
|---|---|---|---|---|---|---|---|---|---|---|---|
| | | Dispersion Solution | | Resin | | Polymerization Initiator | | Silane Coupling Agent | | | |
| | Sample | | Amount (g) | Material | Amount (g) | Material | Amount (g) | Material | Amount (g) | Components (% by weight) | Components (% by weight) |
| Example 126 | Dispersion Solution D | | 3.6 | Resin A<br>Resin B | 2.5<br>2.5 | OXE02 | 0.1 | KBM403 | 0.2 | 20 | 76 |
| Example 127 | Dispersion Solution D | | 21.7 | Resin A<br>Resin B | 1.5<br>1.5 | OXE02 | 0.06 | KBM403 | 0.12 | 60 | 39 |
| Example 128 | Dispersion Solution A | | 9.4 | Resin A<br>Resin B | 2.5<br>2.5 | OXE02 | 0.1 | none | none | 40 | 59 |
| Example 129 | Dispersion Solution A | | 2.3 | Resin A<br>Resin B | 2.5<br>2.5 | OXE02 | 0.1 | none | none | 15 | 83 |
| Example 130 | Dispersion Solution A | | 3.3 | Resin A<br>Resin B | 2.5<br>2.5 | OXE02 | 0.1 | none | none | 20 | 79 |
| Example 131 | Dispersion Solution A | | 14.8 | Resin A<br>Resin B | 1.5<br>1.5 | OXE02 | 0.06 | none | none | 60 | 39 |
| Example 132 | Dispersion Solution A | | 25.5 | Resin A<br>Resin B | 0.5<br>0.5 | OXE02 | 0.02 | none | none | 80 | 20 |
| Example 133 | Dispersion Solution A | | 48.2 | Resin A<br>Resin B | 0.25<br>0.25 | OXE02 | 0.01 | none | none | 85 | 15 |
| Example 134 | Dispersion Solution B | | 8.7 | Resin A<br>Resin B | 2.5<br>2.5 | OXE02 | 0.1 | none | none | 40 | 59 |
| Example 135 | Dispersion Solution C | | 8.9 | Resin A<br>Resin B | 2.5<br>2.5 | OXE02 | 0.1 | none | none | 40 | 59 |
| Example 136 | Dispersion Solution D | | 10.6 | Resin A<br>Resin B | 2.5<br>2.5 | OXE02 | 0.1 | none | none | 40 | 59 |
| Example 137 | Dispersion Solution E | | 9.8 | Resin A<br>Resin B | 2.5<br>2.5 | OXE02 | 0.1 | KBM403 | 0.2 | 40 | 57 |
| Example 138 | Dispersion Solution E | | 2.4 | Resin A<br>Resin B | 2.5<br>2.5 | OXE02 | 0.1 | KBM403 | 0.2 | 15 | 80 |
| Example 139 | Dispersion Solution E | | 3.4 | Resin A<br>Resin B | 2.5<br>2.5 | OXE02 | 0.1 | KBM403 | 0.2 | 20 | 76 |
| Example 140 | Dispersion Solution E | | 26.5 | Resin A<br>Resin B | 0.5<br>0.5 | OXE02 | 0.02 | KBM403 | 0.04 | 80 | 20 |
| Example 141 | Dispersion Solution E | | 50.1 | Resin A<br>Resin B | 0.25<br>0.25 | OXE02 | 0.01 | KBM403 | 0.02 | 85 | 15 |

TABLE 15

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 124 | 26 | 1.558 | 52 | 39 | good | 0.5 |
| Example 125 | 25 | 1.557 | 55 | 48 | good | 0.4 |
| Example 126 | 26 | 1.557 | 54 | 47 | good | 0.5 |
| Example 127 | 27 | 1.559 | 42 | 33 | good | 0.6 |
| Example 128 | 24 | 1.561 | 51 | 40 | good | 0.4 |
| Example 129 | 23 | 1.557 | 56 | 47 | good | 0.3 |
| Example 130 | 25 | 1.558 | 55 | 46 | good | 0.3 |
| Example 131 | 26 | 1.565 | 43 | 32 | good | 0.4 |
| Example 132 | 28 | 1.573 | 32 | 21 | Cracking of core | 0.4 |
| Example 133 | 31 | 1.576 | 24 | 17 | Residue present in non-exposed area, Cracking of core | 0.5 |
| Example 134 | 26 | 1.563 | 50 | 40 | good | 0.6 |
| Example 135 | 25 | 1.563 | 51 | 39 | good | 0.4 |
| Example 136 | 25 | 1.558 | 52 | 40 | good | 0.5 |
| Example 137 | 29 | 1.557 | 52 | 40 | good | 0.5 |
| Example 138 | 30 | 1.556 | 56 | 48 | good | 0.3 |
| Example 139 | 30 | 1.557 | 55 | 47 | good | 0.4 |
| Example 140 | 35 | 1.561 | 31 | 21 | good | 0.5 |
| Example 141 | 40 | 1.562 | 25 | 16 | Residue present in non-exposed area, Cracking of core | 0.6 |

TABLE 16

| | | | | | | | | | | Content of Barium Sulfate based on Amount of Solid | Content of Compoound A and Resin based on Amount of Solid |
|---|---|---|---|---|---|---|---|---|---|---|---|
| | Dispersion Solution | | Resin | | Polymerization Initiator | | Silane Coupling Agent | | | | |
| | Sample | Amount (g) | Material | Amount (g) | Material | Amount (g) | Material | Amount (g) | | Components (% by weight) | Components (% by weight) |
| Example 142 | Dispersion Solution F | 9.1 | Resin A<br>Resin B | 2.5<br>2.5 | OXE02 | 0.1 | KBM403 | 0.2 | | 40 | 57 |
| Example 143 | Dispersion Solution G | 9.3 | Resin A<br>Resin B | 2.5<br>2.5 | OXE02 | 0.1 | KBM403 | 0.2 | | 40 | 57 |
| Example 144 | Dispersion Solution H | 11.0 | Resin A<br>Resin B | 2.5<br>2.5 | OXE02 | 0.1 | KBM403 | 0.2 | | 40 | 57 |
| Example 145 | Dispersion Solution E | 9.4 | Resin A<br>Resin B | 2.5<br>2.5 | OXE02 | 0.1 | none | none | | 40 | 59 |
| Example 146 | Dispersion Solution E | 2.3 | Resin A<br>Resin B | 2.5<br>2.5 | OXE02 | 0.1 | none | none | | 15 | 83 |
| Example 147 | Dispersion Solution E | 3.3 | Resin A<br>Resin B | 2.5<br>2.5 | OXE02 | 0.1 | none | none | | 20 | 79 |
| Example 148 | Dispersion Solution E | 25.5 | Resin A<br>Resin B | 0.5<br>0.5 | OXE02 | 0.02 | none | none | | 80 | 20 |
| Example 149 | Dispersion Solution E | 48.2 | Resin A<br>Resin B | 0.25<br>0.25 | OXE02 | 0.01 | none | none | | 85 | 15 |
| Example 150 | Dispersion Solution F | 8.7 | Resin A<br>Resin B | 2.5<br>2.5 | OXE02 | 0.1 | none | none | | 40 | 59 |
| Example 151 | Dispersion Solution G | 8.9 | Resin A<br>Resin B | 2.5<br>2.5 | OXE02 | 0.1 | none | none | | 40 | 59 |
| Example 152 | Dispersion Solution H | 10.6 | Resin A<br>Resin B | 2.5<br>2.5 | OXE02 | 0.1 | none | none | | 40 | 59 |

TABLE 17

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 142 | 44 | 1.562 | 50 | 41 | good | 0.7 |
| Example 143 | 32 | 1.561 | 49 | 41 | good | 0.5 |
| Example 144 | 30 | 1.551 | 52 | 40 | good | 0.6 |
| Example 145 | 30 | 1.557 | 50 | 40 | good | 0.5 |
| Example 146 | 28 | 1.556 | 54 | 47 | good | 0.3 |
| Example 147 | 29 | 1.557 | 55 | 46 | good | 0.4 |
| Example 148 | 36 | 1.561 | 30 | 20 | Cracking of core | 0.5 |
| Example 149 | 39 | 1.562 | 24 | 15 | Residue present in non-exposed area, Cracking of core | 0.6 |
| Example 150 | 42 | 1.562 | 50 | 41 | good | 0.7 |
| Example 151 | 29 | 1.561 | 51 | 39 | good | 0.5 |
| Example 152 | 31 | 1.551 | 50 | 39 | good | 0.6 |

TABLE 18

| | | | | | | | | | Content of Barium Sulfate based on Amount of Solid | Content of Compoound A and Resin based on Amount of Solid |
|---|---|---|---|---|---|---|---|---|---|---|
| | Dispersion Solution | | Resin | | Polymerization Initiator | | Silane Coupling Agent | | | |
| | Sample | Amount (g) | Material | Amount (g) | Material | Amount (g) | Material | Amount (g) | Components (% by weight) | Components (% by weight) |
| Example 153 | Dispersion Solution I | 9.8 | Resin A | 5 | OXE02 | 0.1 | KBM403 | 0.2 | 40 | 57 |
| Example 154 | Dispersion Solution I | 2.4 | Resin A | 5 | OXE02 | 0.1 | KBM403 | 0.2 | 15 | 80 |
| Example 155 | Dispersion Solution I | 3.4 | Resin A | 5 | OXE02 | 0.1 | KBM403 | 0.2 | 20 | 76 |
| Example 156 | Dispersion Solution I | 15.4 | Resin A | 3 | OXE02 | 0.06 | KBM403 | 0.12 | 60 | 38 |
| Example 157 | Dispersion Solution I | 26.5 | Resin A | 1 | OXE02 | 0.02 | KBM403 | 0.04 | 80 | 20 |

TABLE 18-continued

| | | | | | Components of Paste Compositon | | | | | |
|---|---|---|---|---|---|---|---|---|---|---|
| | Dispersion Solution | | Resin | | Polymerization Initiator | | Silane Coupling Agent | | Content of Barium Sulfate based on Amount of Solid Components (% by weight) | Content of Compoound A and Resin based on Amount of Solid Components (% by weight) |
| Sample | | Amount (g) | Material | Amount (g) | Material | Amount (g) | Material | Amount (g) | | |
| Example 158 | Dispersion Solution I | 50.1 | Resin A | 0.5 | OXE02 | 0.01 | KBM403 | 0.02 | 85 | 15 |
| Example 159 | Dispersion Solution J | 9.1 | Resin A | 5 | OXE02 | 0.1 | KBM403 | 0.2 | 40 | 57 |
| Example 160 | Dispersion Solution J | 2.3 | Resin A | 5 | OXE02 | 0.1 | KBM403 | 0.2 | 15 | 81 |
| Example 161 | Dispersion Solution J | 3.3 | Resin A | 5 | OXE02 | 0.1 | KBM403 | 0.2 | 20 | 76 |
| Example 162 | Dispersion Solution J | 12.7 | Resin A | 3 | OXE02 | 0.06 | KBM403 | 0.12 | 60 | 37 |
| Example 163 | Dispersion Solution J | 12.6 | Resin A | 1 | OXE02 | 0.02 | KBM403 | 0.04 | 80 | 18 |
| Example 164 | Dispersion Solution J | 9.7 | Resin A | 0.5 | OXE02 | 0.01 | KBM403 | 0.02 | 85 | 14 |
| Example 165 | Dispersion Solution K | 9.3 | Resin A | 5 | OXE02 | 0.1 | KBM403 | 0.2 | 40 | 57 |
| Example 166 | Dispersion Solution K | 2.4 | Resin A | 5 | OXE02 | 0.1 | KBM403 | 0.2 | 15 | 80 |
| Example 167 | Dispersion Solution K | 3.4 | Resin A | 5 | OXE02 | 0.1 | KBM403 | 0.2 | 20 | 75 |
| Example 168 | Dispersion Solution K | 13.3 | Resin A | 3 | OXE02 | 0.06 | KBM403 | 0.12 | 60 | 38 |
| Example 169 | Dispersion Solution K | 14.7 | Resin A | 1 | OXE02 | 0.02 | KBM403 | 0.04 | 80 | 20 |
| Example 170 | Dispersion Solution K | 12.4 | Resin A | 0.5 | OXE02 | 0.01 | KBM403 | 0.02 | 85 | 15 |
| Example 171 | Dispersion Solution L | 11.0 | Resin A | 5 | OXE02 | 0.1 | KBM403 | 0.2 | 40 | 57 |
| Example 172 | Dispersion Solution L | 2.5 | Resin A | 5 | OXE02 | 0.1 | KBM403 | 0.2 | 15 | 81 |
| Example 173 | Dispersion Solution L | 3.6 | Resin A | 5 | OXE02 | 0.1 | KBM403 | 0.2 | 20 | 76 |
| Example 174 | Dispersion Solution L | 21.7 | Resin A | 3 | OXE02 | 0.06 | KBM403 | 0.12 | 60 | 39 |

TABLE 19

| | Results | | | | | |
|---|---|---|---|---|---|---|
| | Mean Particle Diameter in Paste Composition (nm) | Refractive Index | Temperature Dependency of the Refractive Index (ppm/° C.) | Coefficient of Linear Expansion (ppm/° C.) | Developability | Optical Propagation Loss (dB/cm) |
| Example 153 | 21 | 1.552 | 51 | 44 | good | 0.4 |
| Example 154 | 20 | 1.550 | 55 | 52 | good | 0.3 |
| Example 155 | 21 | 1.551 | 54 | 51 | good | 0.3 |
| Example 156 | 23 | 1.553 | 44 | 38 | good | 0.4 |
| Example 157 | 26 | 1.556 | 31 | 24 | Residue present in non-exposed area | 0.4 |
| Example 158 | 28 | 1.557 | 26 | 19 | Residue present in non-exposed area, Cracking of core | 0.5 |
| Example 159 | 35 | 1.557 | 51 | 46 | good | 0.6 |
| Example 160 | 33 | 1.552 | 56 | 53 | good | 0.5 |
| Example 161 | 33 | 1.553 | 55 | 51 | good | 0.6 |
| Example 162 | 36 | 1.563 | 43 | 36 | good | 0.7 |
| Example 163 | 37 | 1.574 | 33 | 25 | Residue present in non-exposed area | 0.7 |
| Example 164 | 38 | 1.578 | 25 | 16 | Residue present in non-exposed area, Cracking of core | 0.8 |
| Example 165 | 22 | 1.556 | 49 | 44 | good | 0.4 |
| Example 166 | 21 | 1.552 | 55 | 50 | good | 0.3 |
| Example 167 | 22 | 1.552 | 55 | 49 | good | 0.3 |
| Example 168 | 24 | 1.561 | 43 | 38 | good | 0.4 |
| Example 169 | 26 | 1.569 | 30 | 23 | Residue present in non-exposed area | 0.4 |
| Example 170 | 29 | 1.572 | 24 | 18 | Residue present in non-exposed area, Cracking of core | 0.5 |
| Example 171 | 22 | 1.544 | 53 | 43 | good | 0.5 |
| Example 172 | 21 | 1.548 | 55 | 51 | good | 0.4 |
| Example 173 | 22 | 1.548 | 55 | 51 | good | 0.4 |
| Example 174 | 23 | 1.539 | 43 | 37 | good | 0.6 |

TABLE 20

| | | | | | | | | | | Content of Barium Sulfate based on Amount of Solid | Content of Compoound A and Resin based on Amount of Solid |
|---|---|---|---|---|---|---|---|---|---|---|---|
| | Dispersion Solution | | Resin | | Polymerization Initiator | | Silane Coupling Agent | | | | |
| | Sample | Amount (g) | Material | Amount (g) | Material | Amount (g) | Material | Amount (g) | | Components (% by weight) | Components (% by weight) |
| Example 175 | Dispersion Solution I | 9.4 | Resin A | 5 | OXE02 | 0.1 | none | none | | 40 | 59 |
| Example 176 | Dispersion Solution I | 2.3 | Resin A | 5 | OXE02 | 0.1 | none | none | | 15 | 83 |
| Example 177 | Dispersion Solution I | 3.3 | Resin A | 5 | OXE02 | 0.1 | none | none | | 20 | 79 |
| Example 178 | Dispersion Solution I | 14.8 | Resin A | 3 | OXE02 | 0.06 | none | none | | 60 | 39 |
| Example 179 | Dispersion Solution I | 25.5 | Resin A | 1 | OXE02 | 0.02 | none | none | | 80 | 20 |
| Example 180 | Dispersion Solution I | 48.2 | Resin A | 0.5 | OXE02 | 0.01 | none | none | | 85 | 15 |
| Example 181 | Dispersion Solution J | 8.7 | Resin A | 5 | OXE02 | 0.1 | none | none | | 40 | 59 |
| Example 182 | Dispersion Solution J | 2.2 | Resin A | 5 | OXE02 | 0.1 | none | none | | 15 | 84 |
| Example 183 | Dispersion Solution J | 3.2 | Resin A | 5 | OXE02 | 0.1 | none | none | | 20 | 79 |
| Example 184 | Dispersion Solution J | 12.2 | Resin A | 3 | OXE02 | 0.06 | none | none | | 60 | 39 |
| Example 185 | Dispersion Solution J | 12.1 | Resin A | 1 | OXE02 | 0.02 | none | none | | 80 | 20 |
| Example 186 | Dispersion Solution J | 9.3 | Resin A | 0.5 | OXE02 | 0.01 | none | none | | 85 | 14 |
| Example 187 | Dispersion Solution K | 8.9 | Resin A | 5 | OXE02 | 0.1 | none | none | | 40 | 59 |
| Example 188 | Dispersion Solution K | 2.3 | Resin A | 5 | OXE02 | 0.1 | none | none | | 15 | 83 |
| Example 189 | Dispersion Solution K | 3.3 | Resin A | 5 | OXE02 | 0.1 | none | none | | 20 | 78 |
| Example 190 | Dispersion Solution K | 12.8 | Resin A | 3 | OXE02 | 0.06 | none | none | | 60 | 39 |
| Example 191 | Dispersion Solution K | 14.2 | Resin A | 1 | OXE02 | 0.02 | none | none | | 80 | 20 |
| Example 192 | Dispersion Solution K | 12.0 | Resin A | 0.5 | OXE02 | 0.01 | none | none | | 85 | 15 |
| Example 193 | Dispersion Solution L | 10.6 | Resin A | 5 | OXE02 | 0.1 | none | none | | 40 | 59 |
| Example 194 | Dispersion Solution L | 2.4 | Resin A | 5 | OXE02 | 0.1 | none | none | | 15 | 84 |
| Example 195 | Dispersion Solution L | 3.5 | Resin A | 5 | OXE02 | 0.1 | none | none | | 20 | 78 |
| Example 196 | Dispersion Solution L | 20.9 | Resin A | 3 | OXE02 | 0.06 | none | none | | 60 | 40 |

TABLE 21

| | Results | | | | | |
|---|---|---|---|---|---|---|
| | Mean Particle Diameter in Paste Composition (nm) | Refractive Index | Temperature Dependency of the Refractive Index (ppm/° C.) | Coefficient of Linear Expansion (ppm/° C.) | Developability | Optical Propagation Loss (dB/cm) |
| Example 175 | 23 | 1.552 | 51 | 43 | good | 0.4 |
| Example 176 | 21 | 1.550 | 56 | 52 | good | 0.3 |
| Example 177 | 21 | 1.551 | 55 | 51 | good | 0.3 |
| Example 178 | 24 | 1.553 | 44 | 37 | Residue present in non-exposed area | 0.5 |
| Example 179 | 27 | 1.556 | 30 | 25 | Residue present in non-exposed area, Cracking of core | 0.5 |
| Example 180 | 28 | 1.557 | 25 | 18 | Residue present in non-exposed area, Cracking of core | 0.6 |
| Example 181 | 35 | 1.557 | 53 | 46 | good | 0.7 |
| Example 182 | 33 | 1.552 | 56 | 51 | good | 0.5 |
| Example 183 | 34 | 1.553 | 56 | 50 | good | 0.6 |
| Example 184 | 37 | 1.563 | 45 | 37 | Residue present in non-exposed area | 0.7 |
| Example 185 | 38 | 1.574 | 33 | 25 | Residue present in non-exposed area, Cracking of core | 0.8 |
| Example 186 | 40 | 1.578 | 26 | 17 | Residue present in non-exposed area, Cracking of core | 0.9 |
| Example 187 | 22 | 1.556 | 49 | 44 | good | 0.4 |
| Example 188 | 20 | 1.552 | 56 | 51 | good | 0.3 |
| Example 189 | 20 | 1.552 | 55 | 50 | good | 0.3 |
| Example 190 | 22 | 1.561 | 44 | 37 | Residue present in non-exposed area | 0.5 |
| Example 191 | 26 | 1.569 | 31 | 22 | Residue present in non-exposed area, Cracking of core | 0.5 |

TABLE 21-continued

| | Results | | | | | |
|---|---|---|---|---|---|---|
| | Mean Particle Diameter in Paste Composition (nm) | Refractive Index | Temperature Dependency of the Refractive Index (ppm/° C.) | Coefficient of Linear Expansion (ppm/° C.) | Developability | Optical Propagation Loss (dB/cm) |
| Example 192 | 28 | 1.572 | 25 | 19 | Residue present in non-exposed area, Cracking of core | 0.6 |
| Example 193 | 21 | 1.544 | 53 | 44 | good | 0.5 |
| Example 194 | 20 | 1.548 | 54 | 51 | good | 0.4 |
| Example 195 | 21 | 1.548 | 54 | 50 | good | 0.4 |
| Example 196 | 22 | 1.539 | 43 | 36 | Residue present in non-exposed area | 0.6 |

TABLE 22

| | Components of Paste Composition | | | | | | | | |
|---|---|---|---|---|---|---|---|---|---|
| | Dispersion Solution | | Resin | | Polymerization Initiator | | Silane Coupling Agent | | Content of Barium Sulfate based on Amount of Solid Components (% by weight) | Content of Compoound A and Resin based on Amount of Solid Components (% by weight) |
| | Sample | Amount (g) | Material | Amount (g) | Material | Amount (g) | Material | Amount (g) | | |
| Example 197 | Dispersion Solution M | 9.8 | Resin A | 5 | OXE02 | 0.1 | KBM403 | 0.2 | 40 | 57 |
| Example 198 | Dispersion Solution M | 2.4 | Resin A | 5 | OXE02 | 0.1 | KBM403 | 0.2 | 15 | 80 |
| Example 199 | Dispersion Solution M | 3.4 | Resin A | 5 | OXE02 | 0.1 | KBM403 | 0.2 | 20 | 76 |
| Example 200 | Dispersion Solution M | 15.4 | Resin A | 3 | OXE02 | 0.06 | KBM403 | 0.12 | 60 | 38 |
| Example 201 | Dispersion Solution M | 26.5 | Resin A | 1 | OXE02 | 0.02 | KBM403 | 0.04 | 80 | 20 |
| Example 202 | Dispersion Solution M | 50.1 | Resin A | 0.5 | OXE02 | 0.01 | KBM403 | 0.02 | 85 | 15 |
| Example 203 | Dispersion Solution M | 9.4 | Resin A | 5 | OXE02 | 0.1 | none | none | 40 | 59 |
| Example 204 | Dispersion Solution M | 2.3 | Resin A | 5 | OXE02 | 0.1 | none | none | 15 | 83 |
| Example 205 | Dispersion Solution M | 3.3 | Resin A | 5 | OXE02 | 0.1 | none | none | 20 | 79 |
| Example 206 | Dispersion Solution M | 14.8 | Resin A | 3 | OXE02 | 0.06 | none | none | 60 | 39 |
| Example 207 | Dispersion Solution M | 25.5 | Resin A | 1 | OXE02 | 0.02 | none | none | 80 | 20 |
| Example 208 | Dispersion Solution M | 48.2 | Resin A | 0.5 | OXE02 | 0.01 | none | none | 85 | 15 |

TABLE 23

| | Results | | | | | |
|---|---|---|---|---|---|---|
| | Mean Particle Diameter in Paste Composition (nm) | Refractive Index | Temperature Dependency of the Refractive Index (ppm/° C.) | Coefficient of Linear Expansion (ppm/° C.) | Developability | Optical Propagation Loss (dB/cm) |
| Example 197 | 35 | 1.558 | 51 | 43 | good | 0.6 |
| Example 198 | 34 | 1.552 | 54 | 52 | good | 0.5 |
| Example 199 | 34 | 1.553 | 54 | 51 | good | 0.6 |
| Example 200 | 37 | 1.565 | 45 | 37 | good | 0.6 |
| Example 201 | 39 | 1.578 | 32 | 24 | Residue present in non-exposed area | 0.7 |
| Example 202 | 40 | 1.582 | 26 | 20 | Residue present in non-exposed area, Cracking of core | 0.8 |
| Example 203 | 36 | 1.558 | 52 | 44 | good | 0.6 |
| Example 204 | 33 | 1.552 | 55 | 51 | good | 0.5 |
| Example 205 | 34 | 1.553 | 55 | 49 | good | 0.6 |
| Example 206 | 38 | 1.565 | 45 | 37 | Residue present in non-exposed area | 0.7 |
| Example 207 | 39 | 1.578 | 31 | 25 | Residue present in non-exposed area, Cracking of core | 0.8 |
| Example 208 | 41 | 1.582 | 26 | 19 | Residue present in non-exposed area, Cracking of core | 0.9 |

TABLE 24

| | Dispersion Solution | | Resin | | Polymerization Initiator | | Silane Coupling Agent | | Content of Barium Sulfate based on Amount of Solid | Content of Compoound A and Resin based on Amount of Solid |
|---|---|---|---|---|---|---|---|---|---|---|
| | Sample | Amount (g) | Material | Amount (g) | Material | Amount (g) | Material | Amount (g) | Components (% by weight) | Components (% by weight) |
| Example 209 | Dispersion Solution I | 9.8 | Resin B | 5 | OXE02 | 0.1 | KBM403 | 0.2 | 40 | 57 |
| Example 210 | Dispersion Solution I | 2.4 | Resin B | 5 | OXE02 | 0.1 | KBM403 | 0.2 | 15 | 80 |
| Example 211 | Dispersion Solution I | 3.4 | Resin B | 5 | OXE02 | 0.1 | KBM403 | 0.2 | 20 | 76 |
| Example 212 | Dispersion Solution I | 15.4 | Resin B | 3 | OXE02 | 0.06 | KBM403 | 0.12 | 60 | 38 |
| Example 213 | Dispersion Solution I | 26.5 | Resin B | 1 | OXE02 | 0.02 | KBM403 | 0.04 | 80 | 20 |
| Example 214 | Dispersion Solution I | 50.1 | Resin B | 0.5 | OXE02 | 0.01 | KBM403 | 0.02 | 85 | 15 |
| Example 215 | Dispersion Solution J | 9.1 | Resin B | 5 | OXE02 | 0.1 | KBM403 | 0.2 | 40 | 57 |
| Example 216 | Dispersion Solution K | 9.3 | Resin B | 5 | OXE02 | 0.1 | KBM403 | 0.2 | 40 | 57 |
| Example 217 | Dispersion Solution L | 11.0 | Resin B | 5 | OXE02 | 0.1 | KBM403 | 0.2 | 40 | 57 |
| Example 218 | Dispersion Solution I | 9.4 | Resin B | 5 | OXE02 | 0.1 | none | none | 40 | 59 |
| Example 219 | Dispersion Solution I | 2.3 | Resin B | 5 | OXE02 | 0.1 | none | none | 15 | 83 |
| Example 220 | Dispersion Solution I | 3.3 | Resin B | 5 | OXE02 | 0.1 | none | none | 20 | 79 |
| Example 221 | Dispersion Solution I | 14.8 | Resin B | 3 | OXE02 | 0.06 | none | none | 60 | 39 |
| Example 222 | Dispersion Solution I | 25.5 | Resin B | 1 | OXE02 | 0.02 | none | none | 80 | 20 |
| Example 223 | Dispersion Solution I | 48.2 | Resin B | 0.5 | OXE02 | 0.01 | none | none | 85 | 15 |
| Example 224 | Dispersion Solution J | 8.7 | Resin B | 5 | OXE02 | 0.1 | none | none | 40 | 59 |
| Example 225 | Dispersion Solution K | 8.9 | Resin B | 5 | OXE02 | 0.1 | none | none | 40 | 59 |
| Example 226 | Dispersion Solution L | 10.6 | Resin B | 5 | OXE02 | 0.1 | none | none | 40 | 59 |
| Example 227 | Dispersion Solution M | 9.8 | Resin B | 5 | OXE02 | 0.1 | KBM403 | 0.2 | 40 | 57 |
| Example 228 | Dispersion Solution M | 2.4 | Resin B | 5 | OXE02 | 0.1 | KBM403 | 0.2 | 15 | 80 |
| Example 229 | Dispersion Solution M | 3.4 | Resin B | 5 | OXE02 | 0.1 | KBM403 | 0.2 | 20 | 76 |
| Example 230 | Dispersion Solution M | 26.5 | Resin B | 1 | OXE02 | 0.02 | KBM403 | 0.04 | 80 | 20 |
| Example 231 | Dispersion Solution M | 50.1 | Resin B | 0.5 | OXE02 | 0.01 | KBM403 | 0.02 | 85 | 15 |

TABLE 25

| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
|---|---|---|---|---|---|---|
| Example 209 | 24 | 1.560 | 50 | 37 | good | 0.4 |
| Example 210 | 23 | 1.560 | 53 | 44 | good | 0.3 |
| Example 211 | 23 | 1.560 | 53 | 43 | good | 0.3 |
| Example 212 | 25 | 1.559 | 44 | 26 | Residue present in non-exposed area | 0.4 |
| Example 213 | 28 | 1.559 | 31 | 16 | Residue present in non-exposed area | 0.4 |
| Example 214 | 31 | 1.559 | 24 | 13 | Residue present in non-exposed area, Cracking of core | 0.5 |
| Example 215 | 34 | 1.565 | 49 | 32 | good | 0.6 |
| Example 216 | 22 | 1.564 | 49 | 35 | good | 0.4 |
| Example 217 | 24 | 1.552 | 51 | 35 | good | 0.5 |
| Example 218 | 21 | 1.560 | 51 | 36 | Residue present in non-exposed area | 0.4 |
| Example 219 | 22 | 1.560 | 54 | 44 | good | 0.3 |
| Example 220 | 23 | 1.560 | 53 | 43 | good | 0.3 |
| Example 221 | 23 | 1.559 | 42 | 28 | Residue present in non-exposed area | 0.5 |
| Example 222 | 27 | 1.559 | 32 | 17 | Residue present in non-exposed area, Cracking of core | 0.5 |
| Example 223 | 32 | 1.559 | 22 | 12 | Residue present in non-exposed area, Cracking of core | 0.6 |
| Example 224 | 34 | 1.565 | 49 | 30 | Residue present in non-exposed area | 0.7 |
| Example 225 | 25 | 1.564 | 50 | 35 | Residue present in non-exposed area | 0.4 |
| Example 226 | 26 | 1.552 | 52 | 33 | Residue present in non-exposed area | 0.5 |
| Example 227 | 34 | 1.566 | 53 | 37 | good | 0.6 |

TABLE 25-continued

| | Results | | | | |
|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
|---|---|---|---|---|---|---|
| Example 228 | 33 | 1.562 | 54 | 44 | good | 0.5 |
| Example 229 | 35 | 1.562 | 53 | 41 | good | 0.6 |
| Example 230 | 38 | 1.580 | 34 | 18 | Residue present in non-exposed area | 0.8 |
| Example 231 | 41 | 1.583 | 25 | 12 | Residue present in non-exposed area, Cracking of core | 0.9 |

TABLE 26

| | Components of Paste Composition | | | | | | | | |
|---|---|---|---|---|---|---|---|---|---|
| | Dispersion Solution | | Resin | | Polymerization Initiator | | Silane Coupling Agent | | Content of Barium Sulfate based on Amount of Solid | Content of Compoound A and Resin based on Amount of Solid |
| | Sample | Amount (g) | Material | Amount (g) | Material | Amount (g) | Material | Amount (g) | Components (% by weight) | Components (% by weight) |
|---|---|---|---|---|---|---|---|---|---|---|
| Example 232 | Dispersion Solution I | 9.8 | Resin A<br>Resin B | 2.5<br>2.5 | OXE02 | 0.1 | KBM403 | 0.2 | 40 | 57 |
| Example 233 | Dispersion Solution I | 2.4 | Resin A<br>Resin B | 2.5<br>2.5 | OXE02 | 0.1 | KBM403 | 0.2 | 15 | 80 |
| Example 234 | Dispersion Solution I | 3.4 | Resin A<br>Resin B | 2.5<br>2.5 | OXE02 | 0.1 | KBM403 | 0.2 | 20 | 76 |
| Example 235 | Dispersion Solution I | 15.4 | Resin A<br>Resin B | 1.5<br>1.5 | OXE02 | 0.06 | KBM403 | 0.12 | 60 | 38 |
| Example 236 | Dispersion Solution I | 26.5 | Resin A<br>Resin B | 0.5<br>0.5 | OXE02 | 0.02 | KBM403 | 0.04 | 80 | 20 |
| Example 237 | Dispersion Solution I | 50.1 | Resin A<br>Resin B | 0.25<br>0.25 | OXE02 | 0.01 | KBM403 | 0.02 | 85 | 15 |
| Example 238 | Dispersion Solution J | 9.1 | Resin A<br>Resin B | 2.5<br>2.5 | OXE02 | 0.1 | KBM403 | 0.2 | 40 | 57 |
| Example 239 | Dispersion Solution J | 2.3 | Resin A<br>Resin B | 2.5<br>2.5 | OXE02 | 0.1 | KBM403 | 0.2 | 15 | 81 |
| Example 240 | Dispersion Solution J | 3.3 | Resin A<br>Resin B | 2.5<br>2.5 | OXE02 | 0.1 | KBM403 | 0.2 | 20 | 76 |
| Example 241 | Dispersion Solution J | 12.7 | Resin A<br>Resin B | 1.5<br>1.5 | OXE02 | 0.06 | KBM403 | 0.12 | 60 | 37 |
| Example 242 | Dispersion Solution J | 12.6 | Resin A<br>Resin B | 0.5<br>0.5 | OXE02 | 0.02 | KBM403 | 0.04 | 80 | 18 |
| Example 243 | Dispersion Solution J | 9.7 | Resin A<br>Resin B | 0.25<br>0.25 | OXE02 | 0.01 | KBM403 | 0.02 | 85 | 14 |
| Example 244 | Dispersion Solution K | 9.3 | Resin A<br>Resin B | 2.5<br>2.5 | OXE02 | 0.1 | KBM403 | 0.2 | 40 | 57 |
| Example 245 | Dispersion Solution K | 2.4 | Resin A<br>Resin B | 2.5<br>2.5 | OXE02 | 0.1 | KBM403 | 0.2 | 15 | 80 |
| Example 246 | Dispersion Solution K | 3.4 | Resin A<br>Resin B | 2.5<br>2.5 | OXE02 | 0.1 | KBM403 | 0.2 | 20 | 75 |
| Example 247 | Dispersion Solution K | 13.3 | Resin A<br>Resin B | 1.5<br>1.5 | OXE02 | 0.06 | KBM403 | 0.12 | 60 | 38 |
| Example 248 | Dispersion Solution K | 14.7 | Resin A<br>Resin B | 0.5<br>0.5 | OXE02 | 0.02 | KBM403 | 0.04 | 80 | 20 |
| Example 249 | Dispersion Solution K | 12.4 | Resin A<br>Resin B | 0.25<br>0.25 | OXE02 | 0.01 | KBM403 | 0.02 | 85 | 15 |

TABLE 27

Results

| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
|---|---|---|---|---|---|---|
| Example 232 | 22 | 1.556 | 50 | 41 | good | 0.3 |
| Example 233 | 21 | 1.555 | 54 | 49 | good | 0.3 |
| Example 234 | 23 | 1.555 | 53 | 47 | good | 0.3 |
| Example 235 | 25 | 1.557 | 40 | 33 | good | 0.3 |
| Example 236 | 27 | 1.558 | 31 | 20 | good | 0.4 |
| Example 237 | 32 | 1.558 | 24 | 16 | Residue present in non-exposed area, Cracking of core | 0.5 |
| Example 238 | 36 | 1.561 | 51 | 41 | good | 0.6 |
| Example 239 | 37 | 1.557 | 55 | 47 | good | 0.5 |
| Example 240 | 34 | 1.558 | 53 | 46 | good | 0.6 |
| Example 241 | 38 | 1.567 | 42 | 33 | good | 0.6 |
| Example 242 | 39 | 1.577 | 29 | 21 | good | 0.7 |
| Example 243 | 41 | 1.580 | 25 | 15 | Residue present in non-exposed area, Cracking of core | 0.8 |
| Example 244 | 25 | 1.560 | 51 | 41 | good | 0.3 |
| Example 245 | 23 | 1.556 | 56 | 48 | good | 0.3 |
| Example 246 | 23 | 1.557 | 55 | 47 | good | 0.3 |
| Example 247 | 25 | 1.564 | 44 | 34 | good | 0.3 |
| Example 248 | 28 | 1.571 | 31 | 22 | good | 0.4 |
| Example 249 | 30 | 1.574 | 24 | 17 | Residue present in non-exposed area, Cracking of core | 0.5 |

TABLE 28

Components of Paste Composition

| | Dispersion Solution | | Resin | | Polymerization Initiator | | Silane Coupling Agent | | Content of Barium Sulfate based on Amount of Solid | Content of Compoound A and Resin based on Amount of Solid |
|---|---|---|---|---|---|---|---|---|---|---|
| Sample | | Amount (g) | Material | Amount (g) | Material | Amount (g) | Material | Amount (g) | Components (% by weight) | Components (% by weight) |
| Example 250 | Dispersion Solution L | 11.0 | Resin A<br>Resin B | 2.5<br>2.5 | OXE02 | 0.1 | KBM403 | 0.2 | 40 | 57 |
| Example 251 | Dispersion Solution L | 2.5 | Resin A<br>Resin B | 2.5<br>2.5 | OXE02 | 0.1 | KBM403 | 0.2 | 15 | 81 |
| Example 252 | Dispersion Solution L | 3.6 | Resin A<br>Resin B | 2.5<br>2.5 | OXE02 | 0.1 | KBM403 | 0.2 | 20 | 76 |
| Example 253 | Dispersion Solution L | 21.7 | Resin A<br>Resin B | 1.5<br>1.5 | OXE02 | 0.06 | KBM403 | 0.12 | 60 | 39 |
| Example 254 | Dispersion Solution I | 9.4 | Resin A<br>Resin B | 2.5<br>2.5 | OXE02 | 0.1 | none | none | 40 | 59 |
| Example 255 | Dispersion Solution I | 2.3 | Resin A<br>Resin B | 2.5<br>2.5 | OXE02 | 0.1 | none | none | 15 | 83 |
| Example 256 | Dispersion Solution I | 3.3 | Resin A<br>Resin B | 2.5<br>2.5 | OXE02 | 0.1 | none | none | 20 | 79 |
| Example 257 | Dispersion Solution I | 14.8 | Resin A<br>Resin B | 1.5<br>1.5 | OXE02 | 0.06 | none | none | 60 | 39 |
| Example 258 | Dispersion Solution I | 25.5 | Resin A<br>Resin B | 0.5<br>0.5 | OXE02 | 0.02 | none | none | 80 | 20 |
| Example 259 | Dispersion Solution I | 48.2 | Resin A<br>Resin B | 0.25<br>0.25 | OXE02 | 0.01 | none | none | 85 | 15 |
| Example 260 | Dispersion Solution J | 8.7 | Resin A<br>Resin B | 2.5<br>2.5 | OXE02 | 0.1 | none | none | 40 | 59 |
| Example 261 | Dispersion Solution K | 8.9 | Resin A<br>Resin B | 2.5<br>2.5 | OXE02 | 0.1 | none | none | 40 | 59 |
| Example 262 | Dispersion Solution L | 10.6 | Resin A<br>Resin B | 2.5<br>2.5 | OXE02 | 0.1 | none | none | 40 | 59 |
| Example 263 | Dispersion Solution M | 9.8 | Resin A<br>Resin B | 2.5<br>2.5 | OXE02 | 0.1 | KBM403 | 0.2 | 40 | 57 |
| Example 264 | Dispersion Solution M | 2.4 | Resin A<br>Resin B | 2.5<br>2.5 | OXE02 | 0.1 | KBM403 | 0.2 | 15 | 80 |

TABLE 28-continued

| | Components of Paste Composition | | | | | | | | | |
|---|---|---|---|---|---|---|---|---|---|---|
| | Dispersion Solution | | Resin | | Polymerization Initiator | | Silane Coupling Agent | | Content of Barium Sulfate based on Amount of Solid | Content of Compoound A and Resin based on Amount of Solid |
| Sample | | Amount (g) | Material | Amount (g) | Material | Amount (g) | Material | Amount (g) | Components (% by weight) | Components (% by weight) |
| Example 265 | Dispersion Solution M | 3.4 | Resin A<br>Resin B | 2.5<br>2.5 | OXE02 | 0.1 | KBM403 | 0.2 | 20 | 76 |
| Example 266 | Dispersion Solution M | 26.5 | Resin A<br>Resin B | 0.5<br>0.5 | OXE02 | 0.02 | KBM403 | 0.04 | 80 | 20 |
| Example 267 | Dispersion Solution M | 50.1 | Resin A<br>Resin B | 0.25<br>0.25 | OXE02 | 0.01 | KBM403 | 0.02 | 85 | 15 |

TABLE 29

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 250 | 25 | 1.548 | 51 | 39 | good | 0.5 |
| Example 251 | 24 | 1.553 | 55 | 48 | good | 0.4 |
| Example 252 | 24 | 1.552 | 54 | 46 | good | 0.5 |
| Example 253 | 27 | 1.543 | 42 | 33 | good | 0.6 |
| Example 254 | 23 | 1.556 | 50 | 41 | good | 0.4 |
| Example 255 | 21 | 1.555 | 55 | 47 | good | 0.3 |
| Example 256 | 24 | 1.555 | 55 | 45 | good | 0.3 |
| Example 257 | 25 | 1.557 | 42 | 32 | good | 0.4 |
| Example 258 | 27 | 1.558 | 32 | 22 | Cracking of core | 0.4 |
| Example 259 | 30 | 1.558 | 23 | 18 | Residue present in non-exposed area, Cracking of core | 0.5 |
| Example 260 | 25 | 1.561 | 50 | 40 | good | 0.6 |
| Example 261 | 24 | 1.560 | 51 | 39 | good | 0.4 |
| Example 262 | 24 | 1.548 | 52 | 41 | good | 0.5 |
| Example 263 | 34 | 1.562 | 52 | 40 | good | 0.5 |
| Example 264 | 33 | 1.557 | 55 | 48 | good | 0.3 |
| Example 265 | 34 | 1.558 | 55 | 47 | good | 0.4 |
| Example 266 | 38 | 1.579 | 31 | 22 | good | 0.5 |
| Example 267 | 41 | 1.583 | 24 | 16 | Residue present in non-exposed area, Cracking of core | 0.6 |

TABLE 30

| | Components of Paste Compositon | | | | | | | | | |
|---|---|---|---|---|---|---|---|---|---|---|
| | Dispersion Solution | | Compound A | | Polymerization Initiator | | Silane Coupling Agent | | Content of Barium Sulfate based on Amount of Solid | Content of Compoound A and Resin based on Amount of Solid |
| Sample | | Amount (g) | Material | Amount (g) | Material | Amount (g) | Material | Amount (g) | Components (% by weight) | Components (% by weight) |
| Example 268 | Dispersion Solution M | 9.4 | Resin A<br>Resin B | 2.5<br>2.5 | OXE02 | 0.1 | none | none | 40 | 59 |
| Example 269 | Dispersion Solution M | 2.3 | Resin A<br>Resin B | 2.5<br>2.5 | OXE02 | 0.1 | none | none | 15 | 83 |
| Example 270 | Dispersion Solution M | 3.3 | Resin A<br>Resin B | 2.5<br>2.5 | OXE02 | 0.1 | none | none | 20 | 79 |
| Example 271 | Dispersion Solution M | 25.5 | Resin A<br>Resin B | 0.5<br>0.5 | OXE02 | 0.02 | none | none | 80 | 20 |
| Example 272 | Dispersion Solution M | 48.2 | Resin A<br>Resin B | 0.25<br>0.25 | OXE02 | 0.01 | none | none | 85 | 15 |
| Example 273 | Dispersion Solution A | 9.8 | HOA-MPL | 5 | OXE02 | 0.1 | KBM403 | 0.2 | 40 | 57 |

TABLE 30-continued

| | Components of Paste Compositon | | | | | | | | | |
|---|---|---|---|---|---|---|---|---|---|---|
| | Dispersion Solution | | Compound A | | Polymerization Initiator | | Silane Coupling Agent | | Content of Barium Sulfate based on Amount of Solid | Content of Compoound A and Resin based on Amount of Solid |
| | Sample | Amount (g) | Material | Amount (g) | Material | Amount (g) | Material | Amount (g) | Components (% by weight) | Components (% by weight) |
| Example 274 | Dispersion Solution A | 2.4 | HOA-MPL | 5 | OXE02 | 0.1 | KBM403 | 0.2 | 15 | 80 |
| Example 275 | Dispersion Solution A | 3.4 | HOA-MPL | 5 | OXE02 | 0.1 | KBM403 | 0.2 | 20 | 76 |
| Example 276 | Dispersion Solution A | 15.4 | HOA-MPL | 3 | OXE02 | 0.06 | KBM403 | 0.12 | 60 | 38 |
| Example 277 | Dispersion Solution A | 26.5 | HOA-MPL | 1 | OXE02 | 0.02 | KBM403 | 0.04 | 80 | 20 |
| Example 278 | Dispersion Solution A | 50.1 | HOA-MPL | 0.5 | OXE02 | 0.01 | KBM403 | 0.02 | 85 | 15 |
| Example 279 | Dispersion Solution B | 9.1 | HOA-MPL | 5 | OXE02 | 0.1 | KBM403 | 0.2 | 40 | 57 |
| Example 280 | Dispersion Solution C | 9.3 | HOA-MPL | 5 | OXE02 | 0.1 | KBM403 | 0.2 | 40 | 57 |
| Example 281 | Dispersion Solution D | 11.0 | HOA-MPL | 5 | OXE02 | 0.1 | KBM403 | 0.2 | 40 | 57 |
| Example 282 | Dispersion Solution A | 9.4 | HOA-MPL | 5 | OXE02 | 0.1 | none | none | 40 | 59 |
| Example 283 | Dispersion Solution A | 2.3 | HOA-MPL | 5 | OXE02 | 0.1 | none | none | 15 | 83 |
| Example 284 | Dispersion Solution A | 3.3 | HOA-MPL | 5 | OXE02 | 0.1 | none | none | 20 | 79 |
| Example 285 | Dispersion Solution A | 14.8 | HOA-MPL | 3 | OXE02 | 0.06 | none | none | 60 | 39 |
| Example 286 | Dispersion Solution A | 25.5 | HOA-MPL | 1 | OXE02 | 0.02 | none | none | 80 | 20 |
| Example 287 | Dispersion Solution A | 48.2 | HOA-MPL | 0.5 | OXE02 | 0.01 | none | none | 85 | 15 |
| Example 288 | Dispersion Solution B | 8.7 | HOA-MPL | 5 | OXE02 | 0.1 | none | none | 40 | 59 |
| Example 289 | Dispersion Solution C | 8.9 | HOA-MPL | 5 | OXE02 | 0.1 | none | none | 40 | 59 |
| Example 290 | Dispersion Solution D | 10.6 | HOA-MPL | 5 | OXE02 | 0.1 | none | none | 40 | 59 |

TABLE 31

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Example 268 | 34 | 1.562 | 51 | 40 | good | 0.6 |
| Example 269 | 32 | 1.557 | 54 | 47 | good | 0.5 |
| Example 270 | 33 | 1.558 | 54 | 46 | good | 0.6 |
| Example 271 | 38 | 1.579 | 30 | 22 | Cracking of core | 0.7 |
| Example 272 | 40 | 1.583 | 24 | 16 | Residue present in non-exposed area, Cracking of core | 0.8 |
| Example 273 | 23 | 1.531 | 53 | 43 | good | 0.6 |
| Example 274 | 24 | 1.521 | 56 | 51 | good | 0.5 |
| Example 275 | 24 | 1.523 | 55 | 52 | good | 0.5 |
| Example 276 | 26 | 1.543 | 44 | 37 | good | 0.6 |
| Example 277 | 29 | 1.565 | 30 | 23 | Residue present in non-exposed area | 0.7 |
| Example 278 | 32 | 1.572 | 24 | 18 | Residue present in non-exposed area, Cracking of core | 0.8 |
| Example 279 | 36 | 1.531 | 52 | 42 | good | 0.8 |
| Example 280 | 26 | 1.531 | 52 | 43 | good | 0.6 |
| Example 281 | 26 | 1.531 | 52 | 42 | good | 0.6 |
| Example 282 | 25 | 1.531 | 54 | 42 | good | 0.6 |
| Example 283 | 24 | 1.521 | 56 | 51 | good | 0.5 |
| Example 284 | 25 | 1.523 | 55 | 51 | good | 0.5 |
| Example 285 | 25 | 1.543 | 43 | 36 | good | 0.7 |
| Example 286 | 28 | 1.565 | 31 | 24 | Residue present in non-exposed area, Cracking of core | 0.8 |
| Example 287 | 31 | 1.572 | 24 | 17 | Residue present in non-exposed area, Cracking of core | 0.9 |
| Example 288 | 35 | 1.531 | 51 | 42 | good | 0.8 |
| Example 289 | 25 | 1.531 | 51 | 41 | good | 0.6 |
| Example 290 | 27 | 1.531 | 52 | 40 | good | 0.6 |

Comparative Examples 1 and 2

Each of the paste compositions of the formulations shown in Tables 32 and 33 was prepared by the same method as that in Example 1 and then used to form a cured material for use in evaluation of physical properties and to form an optical waveguide. The results of the evaluation are shown in Tables 32 and 33. The resulting cured materials were soft because of insufficient polymerization, and it was impossible to evaluate the refractive index and the linear expansion coefficient. In addition, the non-exposed area was whitened during the development in the process of forming the optical waveguide. The non-exposed area was not removed by the immersion for 5 minutes, and it was removed by shaking the substrate for 20 minutes in the immersion process. A thin film-like residue was present on the surface of the substrate in the non-exposed area. The patterned optical waveguide in the exposed area had a gentle convex shape. The measurement of optical propagation loss was attempted but failed, because the loss was so large that the propagated light intensity was below the detection limit.

Comparative Examples 3 and 4

Each of the paste compositions of the formulations shown in Tables 32 and 33 was prepared by the same method as that in Example 1 and then used to form a cured material for use in evaluation of physical properties and to form an optical waveguide. The results of the evaluation are shown in Tables 32 and 33. The temperature-dependency of the refractive index and the linear expansion coefficient were both relatively large. The non-exposed area was whitened during the development in the process of forming the optical waveguide. A several μm-thick film was left in the non-exposed area even after the shaking for 20 minutes in the developing solution. The measurement of optical propagation loss was attempted but failed, because the loss was so large that the propagated light intensity was below the detection limit.

Comparative Examples 5 to 10

Each of the paste compositions of the formulations shown in Tables 32 and 33 was prepared by the same method as that in Example 1 and then used to form a cured material for use in evaluation of physical properties and to form an optical waveguide. The results of the evaluation are shown in Tables 32 and 33.

TABLE 32

| | | | | | | | | | Content of Barium Sulfate based on Amount of Solid | Content of Compoound A and Resin based on Amount of Solid |
|---|---|---|---|---|---|---|---|---|---|---|
| | Dispersion Solution | | Resin | | Polymerization Initiator | | Silane Coupling Agent | | | |
| | Sample | Amount (g) | Material | Amount (g) | Material | Amount (g) | Material | Amount (g) | Components (% by weight) | Components (% by weight) |
| Comparative Example 1 | Dispersion Solution N | 9.8 | Resin A | 5 | OXE02 | 0.1 | KBM403 | 0.2 | 40 | 51 |
| Comparative Example 2 | Dispersion Solution N | 9.4 | Resin A | 5 | OXE02 | 0.1 | none | none | 40 | 53 |
| Comparative Example 3 | Dispersion Solution O | 9.1 | Resin A | 5 | OXE02 | 0.1 | KBM403 | 0.2 | 40 | 55 |
| Comparative Example 4 | Dispersion Solution O | 8.8 | Resin A | 5 | OXE02 | 0.1 | none | none | 40 | 57 |
| Comparative Example 5 | Dispersion Solution P | 9.8 | Resin A | 5 | OXE02 | 0.1 | KBM403 | 0.2 | 40 | 57 |
| Comparative Example 6 | Dispersion Solution P | 2.4 | Resin A | 5 | OXE02 | 0.1 | KBM403 | 0.2 | 15 | 80 |
| Comparative Example 7 | Dispersion Solution P | 3.4 | Resin A | 5 | OXE02 | 0.1 | KBM403 | 0.2 | 20 | 76 |
| Comparative Example 8 | Dispersion Solution P | 15.4 | Resin A | 3 | OXE02 | 0.06 | KBM403 | 0.12 | 60 | 38 |
| Comparative Example 9 | Dispersion Solution P | 26.5 | Resin A | 1 | OXE02 | 0.02 | KBM403 | 0.04 | 80 | 20 |
| Comparative Example 10 | Dispersion Solution P | 50.1 | Resin A | 0.5 | OXE02 | 0.01 | KBM403 | 0.02 | 85 | 15 |

TABLE 33

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Comparative Example 1 | 35 | Impossible to evaluate because of insufficient polymerization | | | Unclear pattern, Residue present in non-exposed area | |
| Comparative Example 2 | 34 | Impossible to evaluate because of insufficient polymerization | | | Unclear pattern, Residue present in non-exposed area | |

TABLE 33-continued

| | Results | | | | | |
|---|---|---|---|---|---|---|
| | Mean Particle Diameter in Paste Compositon (nm) | Refractive Index | Temperature Dependency of the Refractive Index (ppm/° C.) | Coefficient of Linear Expansion (ppm/° C.) | Developability | Optical Propagation Loss (dB/cm) |
| Comparative Example 3 | 52 | 1.557 | 74 | 67 | Difficult to remove non-exposed area | |
| Comparative Example 4 | 50 | 1.557 | 74 | 68 | Difficult to remove non-exposed area | |
| Comparative Example 5 | 54 | 1.556 | 53 | 44 | good | 1.0 |
| Comparative Example 6 | 55 | 1.552 | 58 | 53 | good | 0.8 |
| Comparative Example 7 | 54 | 1.553 | 57 | 51 | good | 0.9 |
| Comparative Example 8 | 56 | 1.562 | 46 | 38 | good | 1.2 |
| Comparative Example 9 | 61 | 1.572 | 33 | 24 | good | 1.5 |
| Comparative Example 10 | 62 | 1.575 | 26 | 19 | Residue present in non-exposed area, Cracking of core | 2.3 |

INDUSTRIAL APPLICABILITY

The optical waveguide-forming paste composition of the present invention is suitable for use in forming optical interconnections and other components to transmit information between LSIs on circuit boards which may be used in information-processing devices to make high-speed signal transmission, such as personal computers, hard-disc recorders, DVD recorders, game machines, and cellular phones.

What is claimed is:

1. An optical waveguide-forming paste composition, comprising:

(A) barium sulfate particles with a mean particle diameter of 1 nm or more to 50 nm or less;

(B) a compound having a polymerizable group and a carboxyl group, or a phosphoric ester compound having a polymerizable group; and (C) an organic solvent.

2. The optical waveguide-forming paste composition according to claim 1, wherein the compound having a polymerizable group and a carboxyl group comprises a compound represented by the formula (1):

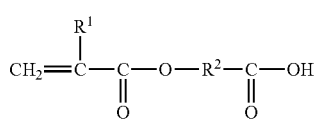

(1)

in the formula (1), $R^1$ represents a hydrogen atom or a methyl group, and $R^2$ represents a bivalent group represented by any one of the following formulae (2) to (4):

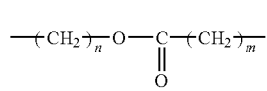

(2)

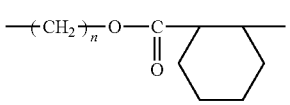

(3)

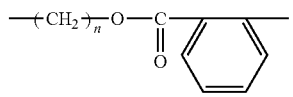

(4)

in the formulae (2) to (4), n and m each represent an integer of 1 to 3.

3. The optical waveguide-forming paste composition according to claim 2, wherein $R^1$ in the formula (1) is a hydrogen atom, $R^2$ is a bivalent group represented by the formula (4), and n is 2.

4. The optical waveguide-forming paste composition according to claim 1, wherein the phosphoric ester compound having a polymerizable group comprises a compound represented by the formula (5):

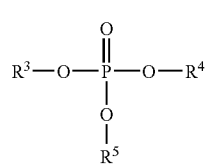

(5)

in the formula (5), $R^3$ to $R^5$ each represent a monovalent group represented by any one of the following formulae (6) to (10) or a hydrogen atom, and $R^3$ to $R^5$ may be the same or different, provided that not all of $R^3$ to $R^5$ are hydrogen atoms:

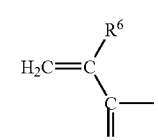

(6)

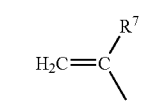

(7)

(8)

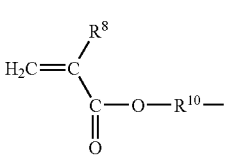

-continued

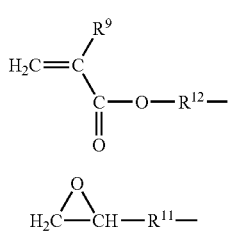

(9)

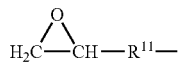

(10)

in the formulae (6) to (10) $R^6$ to $R^9$ each represent a hydrogen atom or a methyl group. $R^{10}$ and $R^{11}$ each represent a bivalent group of 1 to 10 carbon atoms, and $R^{12}$ represents a bivalent group of 1 to 10 carbon atoms having a hydroxyl group.

5. The optical waveguide-forming paste composition according to claim 4, wherein at least one of $R^3$, $R^4$ and $R^5$ in the formula (5) is a monovalent group represented by the formula (8).

6. The optical waveguide-forming paste composition according to claim 1, further comprising a resin having a polymerizable group.

7. The optical waveguide-forming paste composition according to claim 6, wherein the resin having a polymerizable group comprises a resin represented by the formula (11) or (12):

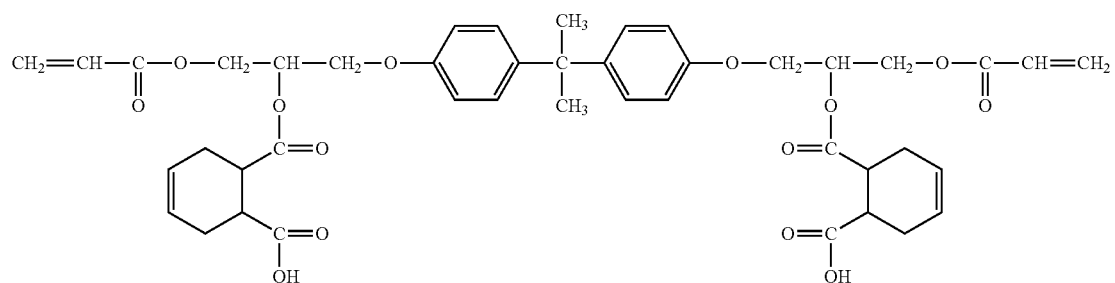

(11)

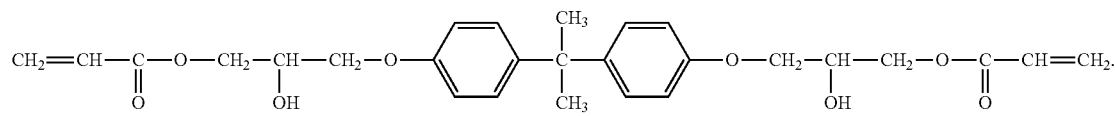

(12)

8. The optical waveguide-forming paste composition according to claim 1, further comprising a silane coupling agent.

9. An optical waveguide, comprising a cured material produced by curing the optical waveguide-forming composition according to claim 1.

* * * * *